United States Patent
Yin et al.

(10) Patent No.: US 9,246,663 B2
(45) Date of Patent: Jan. 26, 2016

(54) SYSTEMS AND METHODS FOR FEEDBACK REPORTING

(71) Applicant: Sharp Laboratories of America, Inc., Camas, WA (US)

(72) Inventors: Zhanping Yin, Vancouver, WA (US); Shohei Yamada, Camas, WA (US)

(73) Assignee: Sharp Kabushiki Kaisha, Osaka (JP)

( * ) Notice: Subject to any disclaimer, the term of this patent is extended or adjusted under 35 U.S.C. 154(b) by 328 days.

(21) Appl. No.: 13/843,303

(22) Filed: Mar. 15, 2013

(65) Prior Publication Data

US 2014/0269539 A1    Sep. 18, 2014

(51) Int. Cl.
*H04W 4/00*    (2009.01)
*H04B 7/005*    (2006.01)
*H04L 5/00*    (2006.01)

(52) U.S. Cl.
CPC .................................... *H04L 5/0092* (2013.01)

(58) Field of Classification Search
USPC .......................................................... 370/329
See application file for complete search history.

(56) References Cited

U.S. PATENT DOCUMENTS

| | | | |
|---|---|---|---|
| 2011/0176461 | A1 | 7/2011 | Astely et al. |
| 2011/0274015 | A1 | 11/2011 | Astely et al. |
| 2012/0113875 | A1 | 5/2012 | Alanärä et al. |
| 2013/0039193 | A1 | 2/2013 | Yin et al. |
| 2013/0044652 | A1 | 2/2013 | Wang et al. |
| 2013/0077523 | A1* | 3/2013 | Ko et al. ........................ 370/252 |
| 2013/0114483 | A1* | 5/2013 | Suzuki .......................... 370/311 |
| 2013/0114577 | A1* | 5/2013 | Cai et al. ........................ 370/336 |
| 2013/0155898 | A1* | 6/2013 | Yin ....................... H04L 1/0026 370/254 |
| 2013/0188617 | A1* | 7/2013 | Dinan ........................... 370/336 |

(Continued)

FOREIGN PATENT DOCUMENTS

| | | |
|---|---|---|
| WO | 2010/086498 | 8/2010 |
| WO | 2011/077288 | 6/2011 |
| WO | 2012/167431 | 12/2012 |

OTHER PUBLICATIONS

CATT, "Further Evaluation Results on TDD UL-DL Reconfigurations," 3GPP TSG RAN WG1 Meeting #72, R1-130051, Jan. 2013.

(Continued)

*Primary Examiner* — Gerald Smarth
(74) *Attorney, Agent, or Firm* — Austin Rapp & Hardman

(57) ABSTRACT

A User Equipment (UE) is described. The UE includes a processor and instructions stored in memory that is in electronic communication with the processor. The UE receives signaling to configure the UE with multiple serving cells wherein each of the multiple serving cells is configured with a first uplink/downlink (UL/DL) configuration. The UE also determines a downlink (DL)-reference UL/DL configuration for a serving cell. The UE further sends Physical Downlink Shared Channel (PDSCH) Hybrid Automatic Repeat Request Acknowledgement/Negative Acknowledgement (HARQ-ACK) information based on the DL-reference UL/DL configuration. In a case that the serving cell is a secondary cell and is configured with additional information enabling dynamic UL/DL reconfiguration, then the DL-reference UL/DL configuration is determined based on a pair formed by a primary cell UL/DL configuration and a secondary cell UL/DL configuration, wherein the secondary cell UL/DL configuration is determined based on at least a UL/DL configuration included in the additional information for the serving cell.

20 Claims, 13 Drawing Sheets

(56) References Cited

U.S. PATENT DOCUMENTS

| | | | | |
|---|---|---|---|---|
| 2013/0201884 | A1* | 8/2013 | Freda | H04W 72/005 370/278 |
| 2013/0242799 | A1* | 9/2013 | Yin | H04L 1/1861 370/254 |
| 2014/0146696 | A1* | 5/2014 | Lin et al. | 370/252 |
| 2014/0169284 | A1* | 6/2014 | Cai et al. | 370/329 |
| 2014/0171054 | A1* | 6/2014 | Cai et al. | 455/418 |

OTHER PUBLICATIONS

CATT, "Signalling Mechanisms for TDD UL-DL Reconfigurations," 3GPP TSG RAN WG1 Meeting #72, R1-130052, Jan. 2013.
Intel Corporation, "Discussion on Signalling Mechanisms for TDD UL-DL Reconfiguration," 3GPP TSG RAN WG1 Meeting #72, R1-130085, Jan. 2013.
ZTE, "Signaling to Reconfigure TDD UL/DL Allocation," 3GPP TSG RAN WG1 Meeting #72, R1-130129, Jan. 2013.
ZTE, "HARQ Timing in TDD-eIMTA," 3GPP TSG RAN WG1 Meeting #72, R1-130130, Jan. 2013.
ITRI, "Evaluation of eIMTA with Different Reconfiguration Time Scaled," 3GPP TSG RAN WG1 Meeting #72, R1-130147, Jan. 2013.
New Postcom, "Discussion on Different Signalling Mechanisms for TDD UL-DL Reconfiguration," 3GPP TSG RAN WG1 Meeting #72, R1-130163, Jan. 2013.
MediaTek Inc., "Discussion on Signaling to Support TDD UL-DL Reconfiguration," 3GPP TSG-RAN WG1 Meeting #72, R1-130216, Jan. 2013.
InterDigital, "Signaling Mechanisms to Support TDD UL-DL Reconfiguration," 3GPP TSG-RAN WG1 Meeting #72, R1-130232, Jan. 2013.
LG Electronics, "Discussion on the Signalling Mechanisms for TDD UL-DL Reconfiguration," 3GPP TSG RAN WG1 Meeting #72, R1-130261, Jan. 2013.
Samsung, "False Alarm Handling in UL-DL Reconfiguration," 3GPP TSG RAN WG1 #72, R1-130292, Jan. 2013.
Samsung, "Signaling Methods for TDD UL-DL Reconfiguration," 3GPP TSG RAN WG1 Meeting #72, R1-130293, Jan. 2013.
HTC, "Methods to Support TDD DL-UL Traffic Adaptation," 3GPP TSG-RAN WG1 #72, R1-130309, Jan. 2013.
Panasonic, "Signalling Mechanisms for TDD UL-DL Reconfiguration," 3GPP TSGT RAN WG1 Meeting #72, R1-130321, Jan. 2013.
NEC Group, "The CSI Measurement for Dynamic TDD System," 3GPP TSG RAN WG1 Meeting #72, R1-130369, Jan. 2013.
NEC Group, "Reconfiguration Signalling and HARQ-Timing for TDD eIMTA System," 3GPP TSG RAN WG1 Meeting #72, R1-130370, Jan. 2013.
NEC Gropu, "Study of Backward Compatibility of TDD eIMTA System," 3GPP TSG RAN WG1 Meeting #72, R1-130371, Jan. 2013.
Research in Motion, UK Limited, "Signalling Methods for TDD UL/DL Reconfiguration with Different Time Scales," 3GPP TSG RAN WG1 Meeting #72, R1-130389, Jan. 2013.
Renesas Mobile Europe Ltd., "Discussion on Backward Compatibility for TDD UL-DL Reconfiguration," 3GPP TSG RAN WG1 Meeting #72, R1-130421, Jan. 2013.
Renesas Mobile Europe Ltd., "Discussion on Signaling Mechanisms for TDD UL-DL Reconfiguration," 3GPP TSG RAN WG1 Meeting #72, R1-130422, Jan. 2013.
Huawei, HiSilicon, "Potential Signaling Enhancements for TDD eIMTA," 3GPP TSG RAN WG1 Meeting #72, R1-130445, Jan. 2013.
Alcatel-Lucent Shanghai Bell, Alcatel-Lucent, "Discussion on Signalling Mechanisms for TDD UL-DL Reconfiguration," 3GPP TSG RAN WG1 Meeting #72, R1-130459, Jan. 2013.
Nokia, Nokia Siemens Networks, "Discussion on Signalling Mechanisms for Dynamic TDD UL-DL Reconfiguration," 3GPP TSG-RAN WG1 Meeting #72, R1-130488, Jan. 2013.
Pantech, "Discussion on Signaling Methods for TDD UL-DL Reconfiguration," 3GPP TSG RAN1 #72, R1-130524, Jan. 2013.
Sharp, "PHY Layer Signalling Considerations of Dynamic TDD UL-DL Reconfiguration," 3GPP TSG-RAN WG1 #72, R1-130532, Jan. 2013.
CMCC, "On Flexible TDD UL-DL Configuration," 3GPP TSG-RAN WG #72, R1-130535, Jan. 2013.
Ericsson, ST-Ericsson, "Dynamic TDD on NCT," 3GPP TSG-RAN WG1 #72, R1-130557, Jan. 2013.
Ericsson, ST-Ericsson, "Signalling Support for Dynamic TDD," 3GPP TSG-RAN WG1 #72, R1-130558, Jan. 2013.
Qualcomm Incorporated, "Signaling Mechanisms for Reconfiguration," 3GPP TSG RAN WG1 Meeting #72, R1-130587, Jan. 2013.
Ericsson, "Finalization for Introducing of Rel-11 Features," 3GPP TSG-RAN WG1 Meeting #71, R1-125402, Nov. 2012.
Editor (Motorola Mobility), "Finalisation for Introducing Rel-11 Features," 3GPP TSG-RAN WG1 Meeting #71, R1-125404, Nov. 2012.
Huawei, "Finalisation for Introducing Rel-11 Features," 3GPP TSG-RAN WG1 Meeting #71, R1-125403, Nov. 2012.
3GPP TR 36.828 V2.0.0, "Further Enhancements to LTE TDD for DL-UL Interference Management and Traffic Adaptation; (Release 11)," Jun. 2012.
CATT, "New Work Item Proposal for Further Enhancements to LTE TDD for DL-UL Interference Management and Traffic Adaptation," 3GPP TSG-RAN Meeting #58, RP-121772, Dec. 2012.
"DAI signalling in DL assignment for CA with different TDD UL-DL configurations", 3GPP TSG RAN WG1 #72 R1-130240, Feb. 1, 2013.
3GPP TS 36.213 V11.1.0, Dec. 2012, pp. 26, 93-98, 104-106, 125-153.
"Discussion on Enhancements for Dynamic TDD UL-DL Configuration", 3GPP TSG-RAN WG1 Meeting #69 R1-122363, May 25, 2012.
International Search Report and Written Opinion issued for International Application No. PCT/JP2014/001240 on Jun. 10, 2014.

* cited by examiner

SYSTEMS AND METHODS FOR FEEDBACK REPORTING

TECHNICAL FIELD

The present disclosure relates generally to communication systems. More specifically, the present disclosure relates to systems and methods for feedback reporting.

BACKGROUND

Wireless communication devices have become smaller and more powerful in order to meet consumer needs and to improve portability and convenience. Consumers have become dependent upon wireless communication devices and have come to expect reliable service, expanded areas of coverage and increased functionality. A wireless communication system may provide communication for a number of wireless communication devices, each of which may be serviced by a base station. A base station may be a device that communicates with wireless communication devices.

As wireless communication devices have advanced, improvements in communication capacity, speed, flexibility and/or efficiency have been sought. However, improving communication capacity, speed, flexibility and/or efficiency may present certain problems.

For example, wireless communication devices may communicate with one or more devices using a communication structure. However, the communication structure used may only offer limited flexibility and/or efficiency. As illustrated by this discussion, systems and methods that improve communication flexibility and/or efficiency may be beneficial.

DETAILED DESCRIPTION

Figure 1:
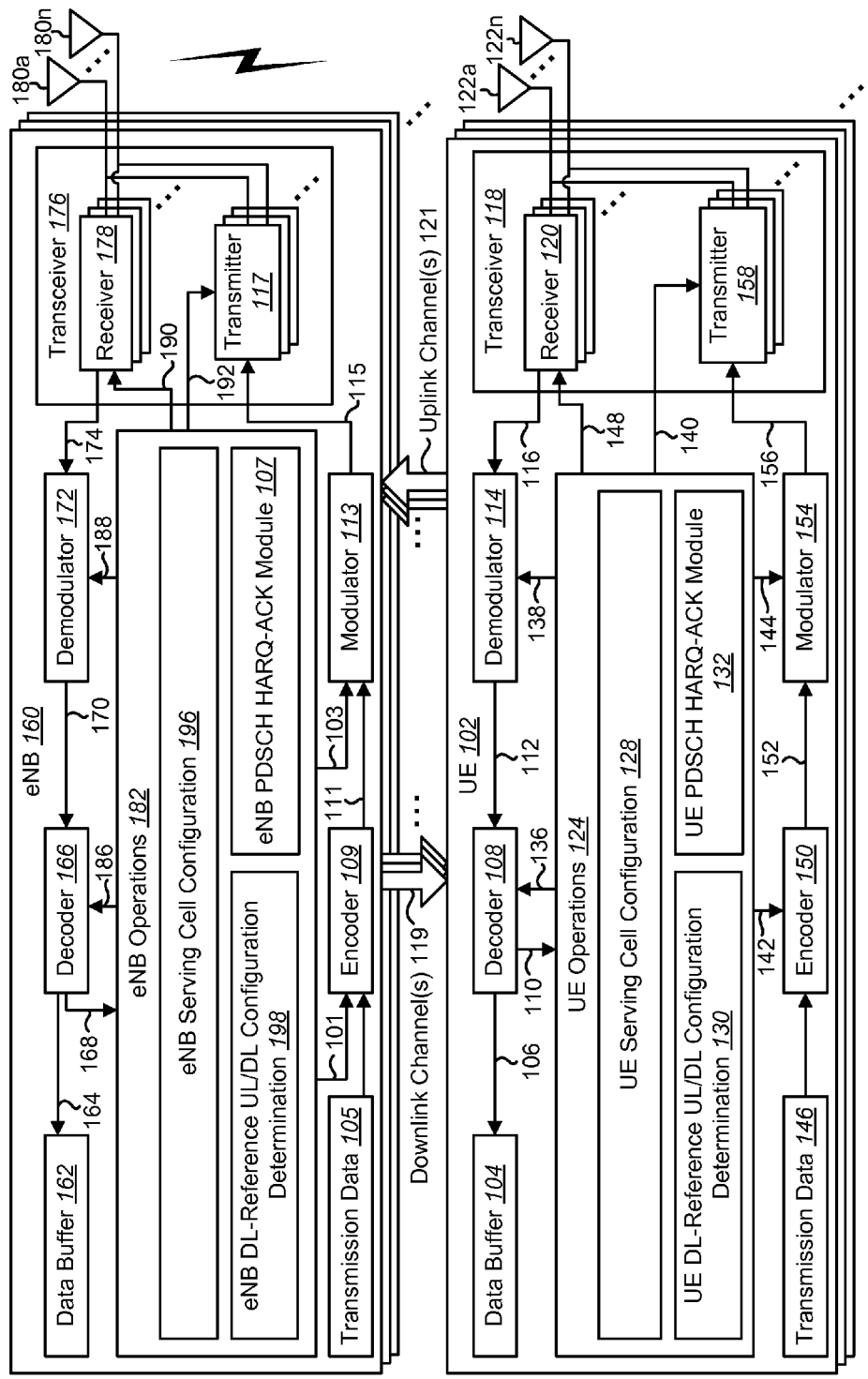
FIG. 1 is a block diagram illustrating one configuration of one or more evolved Node Bs (eNBs) and one or more User Equipments (UEs) in which systems and methods for feedback reporting may be implemented.

A user equipment (UE) for sending feedback is described. The UE includes a processor and memory in electronic communication with the processor. Executable instructions are stored in the memory. The UE receives signaling to configure the UE with multiple serving cells having a first uplink/downlink (UL/DL) configuration for each of the serving cells. If the UE is configured with the multiple serving cells and at least one of the serving cells is configured with additional reconfiguration information that enables dynamic UL/DL reconfiguration, then the UE also determines a downlink (DL)-reference UL/DL configuration for at least one of the serving cells based on the first UL/DL configuration of the at least one serving cell and the additional reconfiguration information of the at least one serving cell. The UE further sends Physical Downlink Shared Channel (PDSCH) Hybrid Automatic Repeat Request Acknowledgement/Negative Acknowledgement (HARQ-ACK) information based on the DL-reference UL/DL configuration.

If the at least one serving cell is a secondary cell, then determining the DL-reference UL/DL configuration for the at least one serving cell may include determining the DL-reference UL/DL configuration based on a pair formed by a primary cell UL/DL configuration and a secondary cell UL/DL configuration. The secondary cell UL/DL configuration may be determined based on a first UL/DL configuration of the at least one serving cell and the additional reconfiguration information.

The primary cell UL/DL configuration may be determined based on a first UL/DL configuration of the primary cell. The primary cell UL/DL configuration may be determined based on a first UL/DL configuration of the primary cell and additional reconfiguration information of the primary cell.

If the at least one serving cell is a primary cell, then determining the DL-reference UL/DL configuration may include determining the DL-reference UL/DL configuration based on a first UL/DL configuration of the at least one serving cell and the additional reconfiguration information. Two or more of the multiple serving cells may have a different first UL/DL configuration.

An evolved Node B (eNB) for receiving feedback is also described. The eNB includes a processor and memory in electronic communication with the processor. Executable instructions are stored in the memory. The eNB sends signaling to configure a user equipment (UE) with multiple serving cells having a first uplink/downlink (UL/DL) configuration for each of the serving cells. If at least one of the serving cells is configured with additional reconfiguration information that enables dynamic UL/DL reconfiguration, then the eNB also determines a downlink (DL)-reference UL/DL configuration for at least one of the serving cells based on the first UL/DL configuration of the at least one serving cell and the additional reconfiguration information of the at least one serving cell. The eNB further receives Physical Downlink Shared Channel (PDSCH) Hybrid Automatic Repeat Request Acknowledgement/Negative Acknowledgement (HARQ-ACK) information based on the DL-reference UL/DL configuration.

If the at least one serving cell is a secondary cell, then determining the DL-reference UL/DL configuration for the at least one serving cell may include determining the DL-reference UL/DL configuration based on a pair formed by a primary cell UL/DL configuration and a secondary cell UL/DL configuration. The secondary cell UL/DL configuration may be determined based on a first UL/DL configuration of the at least one serving cell and the additional reconfiguration information.

The primary cell UL/DL configuration may be determined based on a first UL/DL configuration of the primary cell. The primary cell UL/DL configuration may be determined based on a first UL/DL configuration of the primary cell and additional reconfiguration information of the primary cell.

If the at least one serving cell is a primary cell, then determining the DL-reference UL/DL configuration may include determining the DL-reference UL/DL configuration based on a first UL/DL configuration of the at least one serving cell and the additional reconfiguration information. Two or more of the multiple serving cells may have a different first UL/DL configuration.

A method for sending feedback by a UE is also described. The method includes receiving signaling to configure the UE with multiple serving cells having a first uplink/downlink (UL/DL) configuration for each of the serving cells. If the UE is configured with the multiple serving cells and at least one of the serving cells is configured with additional reconfiguration information that enables dynamic UL/DL reconfiguration, then the method also includes determining a downlink (DL)-reference UL/DL configuration for at least one of the serving cells based on the first UL/DL configuration of the at least one serving cell and the additional reconfiguration information of the at least one serving cell. The method further includes sending Physical Downlink Shared Channel (PDSCH) Hybrid Automatic Repeat Request Acknowledgement/Negative Acknowledgement (HARQ-ACK) information based on the DL-reference UL/DL configuration.

A method for receiving feedback by an eNB is also described. The method includes sending signaling to configure a user equipment (UE) with multiple serving cells having a first uplink/downlink (UL/DL) configuration for each of the serving cells. If at least one of the serving cells is configured with additional reconfiguration information that enables dynamic UL/DL reconfiguration, then the method also includes determining a downlink (DL)-reference UL/DL configuration for at least one of the serving cells based on the first UL/DL configuration of the at least one serving cell and the additional reconfiguration information of the at least one serving cell. The method further includes receiving Physical Downlink Shared Channel (PDSCH) Hybrid Automatic Repeat Request Acknowledgement/Negative Acknowledgement (HARQ-ACK) information based on the DL-reference UL/DL configuration.

The 3rd Generation Partnership Project, also referred to as "3GPP," is a collaboration agreement that aims to define globally applicable technical specifications and technical reports for third and fourth generation wireless communication systems. The 3GPP may define specifications for next generation mobile networks, systems, and devices.

3GPP Long Term Evolution (LTE) is the name given to a project to improve the Universal Mobile Telecommunications System (UMTS) mobile phone or device standard to cope with future requirements. In one aspect, UMTS has been modified to provide support and specification for the Evolved Universal Terrestrial Radio Access (E-UTRA) and Evolved Universal Terrestrial Radio Access Network (E-UTRAN).

At least some aspects of the systems and methods disclosed herein may be described in relation to the 3GPP LTE, LTE-Advanced (LTE-A) and other standards (e.g., 3GPP Releases 8, 9, 10 and/or 11). However, the scope of the present disclosure should not be limited in this regard. At least some aspects of the systems and methods disclosed herein may be utilized in other types of wireless communication systems.

A wireless communication device may be an electronic device used to communicate voice and/or data to a base station, which in turn may communicate with a network of devices (e.g., public switched telephone network (PSTN), the Internet, etc.). In describing systems and methods herein, a wireless communication device may alternatively be referred to as a mobile station, a UE, an access terminal, a subscriber station, a mobile terminal, a remote station, a user terminal, a terminal, a subscriber unit, a mobile device, etc. Examples of wireless communication devices include cellular phones, smart phones, personal digital assistants (PDAs), laptop computers, netbooks, e-readers, wireless modems, etc. In 3GPP specifications, a wireless communication device is typically referred to as a UE. However, as the scope of the present disclosure should not be limited to the 3GPP standards, the terms "UE" and "wireless communication device" may be used interchangeably herein to mean the more general term "wireless communication device."

In 3GPP specifications, a base station is typically referred to as a Node B, an evolved Node B (eNB), a home enhanced or evolved Node B (HeNB) or some other similar terminology. As the scope of the disclosure should not be limited to 3GPP standards, the terms "base station," "Node B," "eNB," and "HeNB" may be used interchangeably herein to mean the more general term "base station." Furthermore, the term "base station" may be used to denote an access point. An access point may be an electronic device that provides access to a network (e.g., Local Area Network (LAN), the Internet, etc.) for wireless communication devices. The term "communication device" may be used to denote both a wireless communication device (e.g., UE) and/or a base station (e.g., eNB).

It should be noted that as used herein, a "cell" may refer to any set of communication channels over which the protocols for communication between a UE and eNB that may be specified by standardization or governed by regulatory bodies to be used for International Mobile Telecommunications-Advanced (IMT-Advanced) or its extensions and all of it or a subset of it may be adopted by 3GPP as licensed bands (e.g., frequency bands) to be used for communication between an eNB and a UE. "Configured cells" are those cells of which the UE is aware and is allowed by an eNB to transmit or receive information. "Configured cell(s)" may be serving cell(s). The UE may receive system information and perform the required measurements on all configured cells. "Activated cells" are those configured cells on which the UE is transmitting and receiving. That is, activated cells are those cells for which the UE monitors the physical downlink control channel (PDCCH) and in the case of a downlink transmission, those cells for which the UE decodes a physical downlink shared channel (PDSCH). "Deactivated cells" are those configured cells that the UE is not monitoring the transmission PDCCH. It should be noted that a "cell" may be described in terms of differing dimensions. For example, a "cell" may have temporal, spatial (e.g., geographical) and frequency characteristics.

The systems and methods disclosed herein describe feedback reporting associated with dynamic UL/DL reconfiguration. A TDD UL/DL reconfiguration may also be written as a TDD UL-DL reconfiguration. In particular, the systems and methods disclosed herein describe PDSCH hybrid automatic repeat request acknowledgement (HARQ-ACK) timing associated with dynamic UL/DL reconfiguration. In some configurations, the systems and methods disclosed herein describe HARQ-ACK reporting reference configurations used in TDD carrier aggregation (CA) for cells that support dynamic UL/DL reconfiguration. It should be noted that dynamic UL/DL reconfiguration may also be referred to as enhanced interference mitigation with traffic adaptation (eIMTA). Therefore, a cell that supports dynamic UL/DL reconfiguration (e.g., a dynamic UL/DL reconfiguration cell) may be referred to as an eIMTA cell. Enhanced interference mitigation with traffic adaptation (eIMTA) is a major topic for LTE TDD networks to enable more flexible use of spectrum using dynamic UL/DL allocation based on traffic load. Therefore, some subframes may be flexible and convertible and may be used as either downlink or uplink as described below.

A dynamic UL/DL reconfiguration cell is a TDD cell that supports dynamic UL/DL reconfiguration to adapt the traffic load on the cell. In LTE time-division duplexing (LTE TDD), the same frequency band may be used for both uplink and downlink signals. To achieve different DL and UL allocations (e.g., traffic ratios) in LTE TDD, seven uplink-downlink (UL/DL) configurations are given in 3GPP specifications (e.g., 3GPP TS 36.211). These allocations can allocate between 40% and 90% of subframes to DL signals.

According to current specifications (e.g., LTE Releases 8, 9, 10 and 11), a system information change procedure is used to change the UL/DL configuration. This procedure has long delay, and requires a cold system restart (e.g., all UEs in a system cannot transmit and receive for a certain period of time in order to disconnect the UL/DL associations of the old configuration and set up new associations). It should be noted that a subframe association may be referred to as a "UL/DL association," which may include UL-to-DL subframe associations and DL-to-UL subframe associations. Examples of associations include association of a DL subframe (PDCCH) to UL power control in a UL subframe, association of a DL subframe physical DL control channel (PDCCH) to physical UL shared channel (PUSCH) allocation in a UL subframe, associations of acknowledgement and negative acknowledgement (ACK/NACK) feedback on UL subframe(s) for physical downlink shared channel (PDSCH) transmissions in DL subframe(s), association of acknowledgement and negative acknowledgement (ACK/NACK) feedback on a physical hybrid automatic repeat request (HARD) indicator channel (PHICH) or physical downlink control channel (PDCCH) for physical UL shared channel (PUSCH) transmission(s) in UL subframe(s), etc.

Known physical (PHY) layer signaling may be extended to enable dynamic DL-to-UL conversion. For example, a special subframe type 2 may be used, which may be viewed as an extension of a current standard special subframe that is used for DL-to-UL transition. This special subframe type 2 can be used to provide UL transmissions while maintaining existing UL/DL associations. PHY layer signaling may also include using DCI 0/4 formats for PUSCH scheduling following the association timings of an UL-reference TDD UL/DL configuration, and using DCI formats 1/2 and extensions for PDSCH scheduling, etc.

As used herein, a "Release 12 UE" may be a UE that may operate in accordance with anticipated 3GPP Release 12 specifications and possibly subsequent specifications. A Release 12 UE may be a UE that supports dynamic UL/DL reconfiguration. Additionally, as used herein, a "legacy UE" may be a UE that may operate in accordance with earlier (e.g., LTE Releases 8, 9, 10, 11) specifications.

Dynamic UL/DL reconfiguration may be applied for both DL-to-UL and UL-to-DL reconfiguration or switching. Dynamic UL/DL reconfiguration allows applying one configuration for PDSCH hybrid automatic repeat request acknowledgement (HARQ-ACK) timing and applying another configuration for PUSCH scheduling and PUSCH HARQ-ACK timing. UEs that support dynamic UL/DL reconfiguration may follow these timings based on the corresponding reference UL/DL configurations in an allowed UL/DL reconfiguration range (e.g., switching region). Legacy UEs may follow the existing associations without any change or knowledge of the dynamic UL/DL reconfiguration. However, the eNB may restrict the legacy UEs in some subframes to maintain backward compatible timing.

In known LTE TDD systems, the UL and DL allocation is chosen from seven defined UL/DL configurations, and is synchronized system-wide. Currently, UL/DL allocation reconfiguration in a cell may be very costly because all transmissions have to be stopped to adjust the UL/DL associations. A change in one cell may cause or accompany a sequence of changes at neighbor cells (and their neighbor cells, etc.) to match UL/DL configuration synchronization at neighbor cells (and their neighbor cells, etc.). Furthermore, current UL/DL allocation reconfiguration requires a system information change. Thus, it has long delay and is not adaptive to instantaneous or short-term changes in traffic load.

The systems and methods disclosed herein provide approaches for applying PDSCH HARQ-ACK timings for UEs that may operate in accordance with anticipated Release 12 specifications (and beyond) based on different DL-reference UL/DL configurations. For legacy UEs, impacts and restrictions of allowing legacy UEs to operate without any modifications to existing timings are also analyzed herein.

Based on an allowed UL/DL reconfiguration range, for example, the PDSCH HARQ-ACK timing may be configured differently for UEs that support dynamic UL/DL reconfiguration than for legacy UEs. A legacy UE should assume no HARQ-ACK timing change. However, the eNB may schedule legacy UEs to avoid potential conflicts.

For UEs that support and are configured with dynamic UL/DL reconfiguration cells, the PDSCH HARQ-ACK timing of a dynamic UL/DL reconfiguration cell may be based on one reference UL/DL configuration, while PUSCH scheduling and PUSCH HARQ-ACK timing of a dynamic UL/DL reconfiguration cell may be based on another reference UL/DL configuration. For example, the PDSCH HARQ-ACK configuration may follow a first reference UL/DL configuration with a number (e.g., minimum number) of UL subframes in the allowed UL/DL reconfiguration range. The first reference UL/DL configuration may or may not be the same as a default UL/DL configuration.

The PUSCH scheduling and PUSCH HARQ-ACK timing of a dynamic UL/DL reconfiguration cell may follow a second reference UL/DL configuration with a number (e.g., maximum number) of UL subframes in the allowed UL/DL reconfiguration range. The second reference UL/DL configuration may or may not be the same as a default UL/DL configuration. For subframes with allowed UL/DL switching (e.g., subframes in one or more convertible regions), systems and methods are provided herein for providing PDSCH HARQ-ACK timing when dynamic UL/DL reconfiguration cell is configured.

The systems and methods disclosed herein may apply a reference UL/DL configuration for PDSCH HARQ-ACK timing of a dynamic UL/DL reconfiguration cell. They may define backward compatible subframes that can be scheduled for legacy UEs, which follow default timing without knowledge of an applied UL/DL reconfiguration. The systems and methods disclosed herein may utilize physical layer signaling to dynamically change the direction in convertible or flexible subframes. They may also provide an approach to decide the direction of each convertible or flexible subframe.

To support dynamic UL and DL reconfiguration while reducing UL/DL allocation reconfiguration (using a system information change, for example), the systems and methods disclosed herein may use physical layer (e.g., PHY layer) signaling to change the UL and DL allocation with traffic adaptation. The PHY layer signaling may be an extension of existing PHY layer signaling so that standard UL/DL associations are maintained.

In current specifications (e.g., LTE Releases 8, 9, 10 and 11), a system information change procedure may be used to change the UL/DL configuration. This procedure requires multiple broadcast channel intervals and thus has a long delay and cannot adapt to an instantaneous traffic load change. Examples of UL/DL associations (in LTE-TDD, for instance) include the association of a PDCCH for UL power control of a UL subframe, association of a PDCCH for physical uplink shared channel (PUSCH) allocation in a UL subframe, associations of ACK/NACK feedback of DL transmission on UL subframe(s), ACK/NACK feedback of UL transmission on PHICH or PDCCH, etc. Due to different UL/DL associations, all transmitters may have to turn off the transmissions altogether to disconnect the UL/DL associations of the old configuration and to set up the new associations.

This may cause a huge loss of system capacity (e.g., offered load on uplink or downlink) and user traffic interruption. Thus, the reconfiguration of UL and DL allocation may also be very costly. Furthermore, a change in one cell may force adjacent cells to change their UL/DL configurations. Thus, a "ripple" effect may occur. With high traffic load fluctuation, frequent UL/DL reconfiguration may cause serious network problems.

When the network aggregated traffic load-to-capacity ratio is low, a UL/DL configuration is acceptable if the UL traffic and DL traffic load can be supported by the allocated UL subframes and DL subframes, respectively. In this case, the actual UL/DL traffic ratio may be the same or different from the UL/DL allocation. On the other hand, if the total traffic load-to-capacity ratio is high, a better matching UL/DL ratio may be configured.

A reconfiguration may be needed in several cases. For example, a reconfiguration may be needed if the allocated UL resource cannot support the UL traffic load. In another example, reconfiguration may be needed if the allocated DL resource cannot support the DL traffic load. Furthermore, a reconfiguration may be used to adapt to a traffic load with a better matching UL/DL allocation. For instance, a reconfiguration may be needed if a current UL/DL configuration does not match the UL-to-DL traffic ratio.

In order to better adapt to traffic conditions, dynamic UL/DL reconfiguration procedures may be supported aside from the system information change. Dynamic UL/DL reconfiguration may maintain backward compatibility (for legacy UEs, for example) and provide more flexibility (for UEs operating in accordance with Release 12 specifications and beyond, for example) with fast subframe modifications based on real-time traffic changes. Furthermore, different UL/DL configurations in neighboring cells may be supported (in Release 11, for example) in a temporary or persistent manner with co-channel interference mitigation techniques. The different UL/DL configurations may be caused by different initial network configurations and/or by dynamic UL/DL reconfiguration changes with traffic adaptation.

In Releases 8, 9, 10 and 11, the TDD UL/DL associations on PDSCH HARQ-ACK, PUSCH scheduling and PUSCH HARQ-ACK are defined by the TDD UL/DL configuration. All legacy UEs in the network follow the same PDSCH HARQ-ACK report associations defined by the given TDD UL/DL configuration. Similarly, all legacy UEs in the network follow the same PUSCH scheduling and PUSCH HARQ-ACK report associations defined by the given TDD UL/DL configuration.

However, dynamic UL/DL reconfiguration provides an approach that may separate PDSCH and PUSCH timing associations based on different reference UL/DL configurations. For example, a network (e.g., one or more UEs and one or more eNBs) may be configured to allow dynamic UL/DL reconfiguration based on traffic adaptation (aside from the default UL/DL configuration as in Releases 8, 9, 10 and 11). For instance, a UE that is configured to allow dynamic UL/DL reconfiguration may utilize one reference UL/DL configuration for PDSCH HARQ-ACK association (e.g., a DL-reference UL/DL configuration) and another reference UL/DL configuration for PUSCH scheduling and PUSCH HARQ-ACK association (e.g., an UL-reference UL/DL configuration), while the UE has knowledge of a default UL/DL configuration (e.g., a first UL/DL configuration). Therefore, because a dynamic UL/DL reconfiguration cell may dynamically change its TDD UL/DL configuration, the DL-reference UL/DL configuration should be specified.

Carrier aggregation (CA) refers to the concurrent utilization of more than one carrier. In CA, more than one cell (e.g., a serving cell) may be aggregated to a UE. In one example, CA may be used to increase the effective bandwidth available to a UE. A serving cell may be a primary cell (PCell) or a secondary cell (SCell). Carrier aggregation (CA) was introduced in LTE Release-10. In Release-10, all aggregated cells have the same TDD UL/DL configuration. In Release-11, TDD CA with different UL/DL configurations was supported.

The DL HARQ-ACK reporting timing of an SCell is decided based on the combination of PCell and SCell configurations. If a dynamic UL/DL reconfiguration-capable cell is used in TDD CA, the UL/DL configuration of the dynamic UL/DL reconfiguration-capable cell may change. Each serving cell may be configured with a UL/DL configuration (referred to as a first UL/DL configuration). The first UL/DL configuration of a dynamic UL/DL reconfiguration-capable cell may be different from the current (e.g., actual) UL/DL configuration. The systems and methods described herein provide various implementations to determine the DL-reference UL/DL configuration of a dynamic UL/DL reconfiguration-capable cell.

In carrier aggregation, a DL-reference UL/DL configuration for the serving cell may be determined for a primary cell and a secondary cell. According to Release-11, if a serving cell is a primary cell, and if the UE is configured with more than one serving cell and if at least two serving cells have different UL/DL configurations, then the PCell UL/DL configuration is the DL-reference UL/DL configuration for the serving cell.

Additionally, according to Release-11, if a serving cell is a secondary cell and at least two serving cells have different UL/DL configurations, the DL HARQ-ACK timing follows a DL-reference UL/DL configuration, which is decided by the combination of a primary cell and the SCell UL/DL configurations. In one TDD CA implementation, the pair formed by a PCell UL/DL configuration and the SCell UL/DL configuration belongs to Set 1 in Table (1) (from Table 10.2-1 of 3GPP TS 36.213) below. In this implementation, the DL-reference UL/DL configuration for the serving cell is defined in the corresponding set in Table (1).

TABLE 1

| Set # | (Primary cell UL/DL configuration, Secondary cell UL/DL configuration) | DL-reference UL/DL configuration |
|---|---|---|
| Set 1 | (0, 0) | 0 |
|  | (1, 0), (1, 1), (1, 6) | 1 |
|  | (2, 0), (2, 2), (2, 1), (2, 6) | 2 |
|  | (3, 0), (3, 3), (3, 6) | 3 |
|  | (4, 0), (4, 1), (4, 3), (4, 4), (4, 6) | 4 |
|  | (5, 0), (5, 1), (5, 2), (5, 3), (5, 4), (5, 5), (5, 6) | 5 |
|  | (6, 0), (6, 6) | 6 |
| Set 2 | (0, 1), (6, 1) | 1 |
|  | (0, 2), (1, 2), (6, 2) | 2 |
|  | (0, 3), (6, 3) | 3 |
|  | (0, 4), (1, 4), (3, 4), (6, 4) | 4 |

TABLE (2)

| UL/DL Configuration | Subframe n | | | | | | | | | |
|---|---|---|---|---|---|---|---|---|---|---|
| | 0 | 1 | 2 | 3 | 4 | 5 | 6 | 7 | 8 | 9 |
| 0 | — | — | 6 | — | 4 | — | — | 6 | — | 4 |
| 1 | — | — | 7, 6 | 4 | — | — | — | 7, 6 | 4 | — |
| 2 | — | — | 8, 7, 4, 6 | — | — | — | — | 8, 7, 4, 6 | — | — |
| 3 | — | — | 7, 6, 11 | 6, 5 | 5, 4 | — | — | — | — | — |
| 4 | — | — | 12, 8, 7, 11 | 6, 5, 4, 7 | — | — | — | — | — | — |
| 5 | — | — | 13, 12, 9, 8, 7, 5, 4, 11, 6 | — | — | — | — | — | — | — |
| 6 | — | — | 7 | 7 | 5 | — | — | 7 | 7 | — |

TABLE 1-continued

| Set # | (Primary cell UL/DL configuration, Secondary cell UL/DL configuration) | DL-reference UL/DL configuration |
|---|---|---|
|  | (0, 5), (1, 5), (2, 5), (3, 5), (4, 5), (6, 5) | 5 |
|  | (0, 6) | 6 |
| Set 3 | (3, 1), (1, 3) | 4 |
|  | (3, 2), (4, 2), (2, 3), (2, 4) | 5 |
| Set 4 | (0, 1), (0, 2), (0, 3), (0, 4), (0, 5), (0, 6) | 0 |
|  | (1, 2), (1, 4), (1, 5) | 1 |
|  | (2, 5) | 2 |
|  | (3, 4), (3, 5) | 3 |
|  | (4, 5) | 4 |
|  | (6, 1), (6, 2), (6, 3), (6, 4), (6, 5) | 6 |
| Set 5 | (1, 3) | 1 |
|  | (2, 3), (2, 4) | 2 |
|  | (3, 1), (3, 2) | 3 |
|  | (4, 2) | 4 |

In another TDD CA implementation in which a serving cell is a secondary cell and at least two serving cells have different UL/DL configurations, the UE is not configured to monitor a physical downlink control channel (PDCCH) or enhanced physical downlink control channel (EPDCCH) with a carrier indicator field for the serving cell. If the pair formed by a PCell UL/DL configuration and the SCell UL/DL configuration belongs to Set 2 or Set 3 in Table (1), then the DL-reference UL/DL configuration for the serving cell is also defined in the corresponding set in Table (1).

In yet another TDD CA implementation in which a serving cell is a secondary cell and at least two serving cells have different UL/DL configurations, the UE is configured to monitor a PDCCH or EPDCCH with a carrier indicator field for the serving cell. If the pair formed by a PCell UL/DL configuration and the SCell UL/DL configuration belongs to Set 4 or Set 5 in Table (1), then the DL-reference UL/DL configuration for the serving cell is defined for the corresponding set in Table (1).

In another TDD CA implementation in which a serving cell is a secondary cell and at least two serving cells have different UL/DL configurations, the UE is not configured to monitor PDCCH with a carrier indicator field for the serving cell. If the pair formed by a PCell UL/DL configuration and the SCell UL/DL configuration belongs to {(3,2),(4,2),(2,3),(2,4)}, then the UE is not expected to be configured with more than two serving cells.

For TDD operating according to Release-11, if a UE is configured with one serving cell, or the UE is configured with more than one serving cell and the UL/DL configurations of all serving cells is the same, then the UE shall, upon detection of a PDSCH transmission within subframe(s) n−k, where k∈K and K is defined in Table (2) below (from Table 10.1.3.1-1 of 3GPP TS 36.213), intended for the UE and for which a HARQ-ACK response shall be provided, transmit the HARQ-ACK response in UL subframe n.

Furthermore, in an implementation of TDD operating according to Release-11, if a UE is configured with more than one serving cell and if at least two serving cells have different UL/DL configurations, then the UE shall, upon detection of a PDSCH transmission within subframe(s) n−k for serving cell c, where k∈$K_C$ intended for the UE and for which a HARQ-ACK response shall be provided, transmit the HARQ-ACK response in UL subframe n. Set $K_C$ contains values of k∈K such that subframe n−k corresponds to a DL subframe for serving cell c. The K value defined in Table (2) (where "UL/DL configuration" in Table 10.1.3.1-1 refers to the "DL-reference UL/DL configuration") is associated with subframe n.

For HARQ-ACK bundling in TDD operating according to Release-11, if the UE detects that at least one downlink assignment has been missed, the UE shall not transmit HARQ-ACK on a PUCCH if HARQ-ACK is the only uplink control information (UCI) present in a given subframe. Furthermore, the uplink timing for the ACK corresponding to a detected PDCCH indicating downlink semi-persistent scheduling (SPS) release shall be the same as the uplink timing for the HARQ-ACK corresponding to a detected PDSCH, as defined above.

In Release-12, dynamic UL/DL reconfiguration (e.g., eIMTA) is considered for a TDD cell. With dynamic UL/DL reconfiguration, a cell may dynamically change the TDD UL/DL configuration based on the traffic load. The systems and methods described herein provide ways to decide the DL-reference UL/DL configuration of a dynamic UL/DL reconfiguration cell for CA. These systems and methods have the benefit of adapting the mechanisms of Release 11 and earlier to allow for dynamic UL/DL reconfiguration in such a way as to minimize system and specification complexity. Also these systems and methods have the benefit of allowing a combination of carrier aggregation and dynamic UL/DL reconfiguration.

There are various scenarios in which dynamic UL/DL reconfiguration for TDD CA may be beneficial. In a first scenario, multiple femto cells may be deployed on the same carrier frequency. In a second scenario, multiple femto cells may be deployed on the same carrier frequency and multiple macro cells may be deployed on an adjacent carrier frequency where all macro cells have the same UL/DL configuration and femto cells can adjust their UL/DL configuration. In a third scenario, multiple outdoor pico cells may be deployed on the same carrier frequency. In a fourth scenario, multiple outdoor pico cells may be deployed on the same carrier frequency and multiple macro cells may be deployed on an adjacent carrier frequency where all macro cells have the same UL/DL configuration and outdoor pico cells can adjust their UL/DL configuration.

In the third and fourth scenarios, the dynamic UL/DL reconfiguration feature may be limited to pico cells with interference mitigation and TDD UL/DL reconfiguration signaling. The fourth scenario may be the most common deployment for TDD carrier aggregation where a macro cell has a fixed TDD UL/DL configuration and the pico cell is a dynamic UL/DL reconfiguration cell. Furthermore, either the macro cell or the pico cell may be configured as the primary cell (PCell) in TDD CA. The dynamic UL/DL reconfiguration-capable pico cell may have the same or different TDD UL/DL configurations as the macro cell.

In one implementation of TDD CA with dynamic UL/DL reconfiguration, a first UL/DL configuration may be the default UL/DL configuration of a dynamic UL/DL reconfiguration cell. The first UL/DL configuration may be configured the same way as in Release-8, 9, 10 and 11. For example, the first UL/DL configuration may be signaled with a system information block-1 (SIB1). The first (e.g., default) UL/DL configuration may be configured by a TDD-Config information element (IE) in a SIB or master information block (MIB). For a UE that does not support dynamic UL/DL reconfiguration, the UE may treat a dynamic UL/DL reconfiguration cell as a regular TDD cell with the first UL/DL configuration. For a UE that supports dynamic UL/DL reconfiguration, the first UL/DL configuration may be the most commonly used configuration.

A UE that does not support dynamic UL/DL reconfiguration refers to a legacy UE (e.g., a Release-8, 9, 10 or 11 UE) that does not understand eIMTA signaling or a Release-12 and beyond UE that is configured not to use eIMTA capability (e.g., the eIMTA capability is set to FALSE or eIMTA config is set to FALSE). Additionally, a Release-12 and beyond UE that is configured not to use eIMTA capability may refer to a UE that is configured not to apply any additional information that enables dynamic UL/DL reconfiguration, a UE that is configured not to apply dynamic UL/DL reconfiguration, etc. A UE that supports dynamic UL/DL reconfiguration refers to a Release-12 and beyond UE that is configured with eIMTA support (e.g., the eIMTA capability is set to TRUE, eIMTA config set to TRUE).

The UL/DL reconfiguration range of a dynamic UL/DL reconfiguration cell may be defined by several UL/DL configurations. The UL/DL reconfiguration range may be defined by a DL-reference UL/DL configuration and a UL reference UL/DL configuration. The flexible subframes are defined by the subframes that have different directions or allocations in these UL/DL configurations. The UL/DL configurations may include a primary UL/DL configuration and one or more secondary UL/DL configurations.

Therefore, a dynamic UL/DL reconfiguration-capable cell may have a first UL/DL configuration and a UL/DL reconfiguration range. The first UL/DL configuration and the UL/DL reconfiguration range may be considered as an ordered pair of a default UL/DL configuration (e.g., first UL/DL configuration) and a set of achievable (or admissible) UL/DL configurations (e.g., the UL/DL reconfiguration range).

For PDSCH HARQ-ACK reporting, a DL-reference UL/DL configuration of a serving cell may be the reference UL/DL configuration of a serving cell for DL HARQ-ACK reporting timing when more than one serving cell is configured for a UE. As discussed above, the serving cell may be a PCell or an SCell. Furthermore, the serving cell may be a legacy TDD cell or a dynamic UL/DL reconfiguration cell.

The DL-reference UL/DL configuration of a dynamic UL/DL reconfiguration cell may be the reference UL/DL configuration of a dynamic UL/DL reconfiguration cell for DL HARQ-ACK reporting timing when the dynamic UL/DL reconfiguration cell is used alone. If the dynamic UL/DL reconfiguration cell is aggregated with other cells, the DL-reference UL/DL configuration of the configured dynamic UL/DL reconfiguration serving cell may be the same or different from the DL-reference UL/DL configuration of the dynamic UL/DL reconfiguration cell when used alone, as discussed below.

For single dynamic UL/DL reconfiguration cell operation, there are several implementations to determine the DL-reference UL/DL configuration for DL HARQ-ACK reporting timing for the dynamic UL/DL reconfiguration cell. For legacy UEs that are not capable of dynamic UL/DL reconfiguration support or a Release-12 and beyond UE that is configured not to use eIMTA capability (e.g., the eIMTA capability is set to FALSE), a dynamic UL/DL reconfiguration cell may be treated as a legacy TDD CA with a first (e.g., default) UL/DL configuration. Therefore, it is up to the eNB scheduler to avoid conflicts in flexible subframes between the legacy UEs and dynamic UL/DL reconfiguration-capable UEs.

In one implementation, for UEs that support dynamic UL/DL reconfiguration to determine the DL-reference UL/DL configuration for single dynamic UL/DL reconfiguration cell operation, several UL/DL configurations may be configured for a dynamic UL/DL reconfiguration cell. A DL-reference UL/DL configuration may then be derived to determine the downlink association set for PDSCH HARQ-ACK reporting. This DL-reference UL/DL configuration may be referred to as the first reference UL/DL configuration. The DL-reference UL/DL configuration may be a configuration with only fixed UL allocations among all configured UL/DL configurations.

A UL-reference UL/DL configuration may also be derived for PUSCH scheduling and HARQ-ACK reporting, known as the second reference UL/DL configuration. The UL-reference UL/DL configuration may be a configuration with only fixed DL or special subframe allocations. Therefore, if all configurations have the same periodicity, among these configurations, the UL/DL configuration with minimum UL allocation (e.g., maximum DL allocation) may be used as the DL-reference UL/DL configuration (e.g., the first reference UL/DL configuration). Furthermore, the UL/DL configuration with maximum UL allocation (e.g., minimum DL allocation) may be used as the UL-reference UL/DL configuration (e.g., the second reference UL/DL configuration).

If the UL/DL configurations have different periodicity, the first reference UL/DL configuration is a configuration defined by the fixed UL allocations among all configured configurations, and the second reference UL/DL configuration is defined by the fixed DL or special subframe allocations among all configured UL/DL configurations. Therefore, the reference UL/DL configurations may be the same as one of the configured UL/DL configurations, or the reference UL/DL configurations may be different from the configured UL/DL configurations. The first reference UL/DL configuration (e.g., the DL-reference UL/DL configuration) and the second reference UL/DL configuration (e.g., the UL-reference UL/DL configuration) may be selected from the seven existing TDD UL/DL configurations.

With this implementation, the PDSCH HARQ-ACK association and timing may follow the first reference UL/DL configuration (e.g., the DL-reference UL/DL configuration) of the dynamic UL/DL reconfiguration cell. Because all flexible subframes are included in the subset of DL subframes of the DL-reference UL/DL configuration, the DL-reference UL/DL configuration may be used regardless of the actual flexible subframe allocation.

In another implementation to determine the DL-reference UL/DL configuration for single dynamic UL/DL reconfiguration cell operation, the UL/DL configuration of a dynamic UL/DL reconfiguration cell is signaled for a UL/DL reconfiguration. The new UL/DL configuration may be applied after the reconfiguration (e.g., transition). Therefore, a UE may always have a current TDD UL/DL configuration (e.g., the actual UL/DL configuration in use). The current UL/DL configuration may be the same as or different from the first (e.g., default) UL/DL configuration. The current UL/DL configuration may be any configuration within the UL/DL reconfiguration range. Since the current UL/DL configuration is known to both eNB and the UE, the PDSCH HARQ-ACK association and timing may follow the current UL/DL configuration of the dynamic UL/DL reconfiguration cell. In other words, the DL-reference UL/DL configuration of a dynamic UL/DL reconfiguration cell may be the current UL/DL configuration of the dynamic UL/DL reconfiguration cell.

In yet another implementation to determine the DL-reference UL/DL configuration for single dynamic UL/DL reconfiguration cell operation, a fixed UL/DL configuration may be used as the DL-reference UL/DL configuration for a dynamic UL/DL reconfiguration cell. For example, if a dynamic UL/DL reconfiguration SCell has 5 millisecond (ms) periodicity, then TDD UL/DL configuration 2 may be used as the DL-reference UL/DL configuration. If the dynamic UL/DL reconfiguration SCell has 10 ms periodicity, then TDD UL/DL configuration 5 may be used as the DL-reference UL/DL configuration.

In TDD carrier aggregation with a dynamic UL/DL reconfiguration cell, the DL-reference UL/DL configuration of the dynamic UL/DL reconfiguration cell may also be determined. As mentioned above, a fourth TDD carrier aggregation scenario may be the most common deployment of TDD carrier aggregation where a macro cell has a fixed UL/DL configuration and the pico cell is a dynamic UL/DL reconfiguration cell. With TDD CA, either the macro cell or the pico cell may be configured as the PCell. A dynamic UL/DL reconfiguration cell may perform dynamic UL/DL reconfiguration for traffic adaptation.

For a legacy UE (e.g., Release-8, 9, 10 and 11 UEs) that are not capable of dynamic UL/DL reconfiguration support, or a Release-12 and beyond UE that is configured not to use eIMTA capability (e.g., the eIMTA capability is set to FALSE), during TDD CA a dynamic UL/DL reconfiguration cell may be treated as a regular TDD CA with a default UL/DL configuration. Therefore, the reference UL/DL configuration of a dynamic UL/DL reconfiguration serving cell may be decided based on the same method as in Release-11 by applying the default UL/DL configuration as the dynamic UL/DL reconfiguration cell UL/DL configuration. The dynamic UL/DL reconfiguration cell may be a PCell or SCell.

Therefore, in one implementation of TDD CA, if a legacy UE is configured with more than one serving cell and if at least two serving cells have different UL/DL configurations and if a serving cell is a PCell, then the PCell UL/DL configuration is the DL-reference UL/DL configuration for the serving cell.

In another implementation of TDD CA with a legacy UE or a Release-12 and beyond UE that is configured not to use eIMTA capability (e.g., the eIMTA capability is set to FALSE), the UE may be configured with more than one serving cell and at least two serving cells have different UL/DL configurations. If a serving cell is an SCell, and the DL-reference UL/DL configuration for a serving cell is based on the pair formed by a PCell UL/DL configuration and the SCell UL/DL configuration in Table (1) above, then the first (e.g., default) UL/DL configuration of a dynamic UL/DL reconfiguration cell is used as the UL/DL configuration of the dynamic UL/DL reconfiguration serving cell. It is up to the eNB scheduler to avoid conflicts in flexible subframes between the legacy UEs and dynamic UL/DL reconfiguration-capable UEs. For example, the eNB may set the first (e.g., default) UL/DL configuration as the UL/DL configuration with minimum UL allocation within the allowed UL/DL reconfiguration range.

For UEs that support dynamic UL/DL reconfiguration (e.g., Release-12 and beyond UEs that are configured with eIMTA support), the DL-reference UL/DL configuration of a dynamic UL/DL reconfiguration cell may be used to determine the DL-reference UL/DL configuration of a serving cell. Different approaches may be applied if a dynamic UL/DL reconfiguration cell is configured as a PCell or if a dynamic UL/DL reconfiguration cell is configured as an SCell.

In one TDD CA scenario, the PCell is a regular TDD cell with fixed UL/DL allocation, and a dynamic UL/DL reconfiguration cell is configured as an SCell. The DL-reference configuration of the PCell may be the PCell UL/DL configuration, which is the same as in Release-11. For the SCell (which is capable of dynamic UL/DL reconfiguration), several implementations may be considered for the PDSCH HARQ-ACK association and timing. For a dynamic UL/DL reconfiguration SCell, the DL-reference UL/DL configuration may be determined based on the pair formed by a PCell UL/DL configuration and the SCell UL/DL configuration, where the SCell UL/DL configuration is replaced by the DL-reference UL/DL configuration of the dynamic UL/DL reconfiguration SCell.

In one implementation involving a dynamic UL/DL reconfiguration SCell in TDD CA, the SCell may be configured with several UL/DL configurations (e.g., a UL/DL reconfiguration range). Then, a DL-reference UL/DL configuration may be derived for PDSCH HARQ-ACK reporting. This DL-reference UL/DL configuration may be referred to as the first reference UL/DL configuration. The DL-reference UL/DL configuration should be a TDD UL/DL configuration with only fixed UL allocations among all configured configurations. Therefore, if all UL/DL configurations have the same periodicity, among these UL/DL configurations, then the UL/DL configuration with minimum UL allocation (e.g., maximum DL allocation) may be used as the DL-reference UL/DL configuration (e.g., first reference UL/DL configuration). If the UL/DL configurations have different periodicity, then the first reference UL/DL configuration is a UL/DL configuration defined by the fixed UL allocations among all configured UL/DL configurations. The first reference UL/DL reference configuration (e.g., the DL-reference UL/DL configuration) may be selected from the seven existing TDD UL/DL configurations.

In this implementation, the DL-reference UL/DL configuration of the SCell (e.g., the first reference UL/DL configuration of the SCell) may be used as the SCell UL/DL configuration. Therefore, the DL-reference UL/DL configuration of the SCell may be set as the SCell UL/DL configuration. Then, the DL-reference UL/DL configuration of the serving cell is determined based on the pair formed by a PCell UL/DL configuration and the SCell UL/DL configuration in Table (1) above, where the SCell UL/DL configuration is the DL-reference UL/DL configuration of the dynamic UL/DL reconfiguration SCell.

In another implementation involving a dynamic UL/DL reconfiguration SCell in TDD CA, the SCell UL/DL configuration may be signaled for a UL/DL reconfiguration. In this implementation, a new UL/DL configuration is applied on the SCell after the reconfiguration (e.g., transition). Therefore, a UE always has a current TDD UL/DL configuration (e.g., the actual UL/DL configuration) in use. Since the current UL/DL configuration is known to both eNB and the UE, the PDSCH HARQ-ACK association and timing may follow the current UL/DL configuration of the dynamic UL/DL reconfiguration cell. In other words, the DL-reference UL/DL configuration of a dynamic UL/DL reconfiguration SCell may be the current UL/DL configuration of the SCell. It should be noted that because the dynamic UL/DL reconfiguration SCell may change UL/DL configurations, the current UL/DL configuration may differ from a first (e.g., default) UL/DL configuration.

In this implementation, the DL-reference UL/DL configuration of the SCell (e.g., the current UL/DL configuration of the dynamic UL/DL reconfiguration SCell) may be used as the SCell UL/DL configuration. Therefore, the current UL/DL configuration of the SCell is set as the SCell UL/DL configuration. Then, the DL-reference UL/DL configuration of the serving cell may be determined based on the pair formed by a PCell UL/DL configuration and the SCell UL/DL configuration in Table (1) above, where the SCell UL/DL configuration is the current UL/DL configuration of the dynamic UL/DL reconfiguration SCell.

In yet another implementation involving a dynamic UL/DL reconfiguration SCell in TDD CA, a fixed UL/DL configuration may be used as the DL-reference UL/DL configuration for the SCell. For example, if both the PCell and the dynamic UL/DL reconfiguration SCell have a 5 ms periodicity, then TDD configuration 2 may be used as the DL-reference UL/DL configuration. If either the PCell or the dynamic UL/DL reconfiguration SCell has 10 ms periodicity, then TDD configuration 5 may be used as the DL-reference UL/DL configuration. Then, the DL-reference UL/DL configuration of the serving cell may be determined based on the pair formed by a PCell UL/DL configuration and the SCell UL/DL configuration in Table (1) above, where the SCell UL/DL configuration is the fixed DL-reference UL/DL configuration.

In another implementation involving a dynamic UL/DL reconfiguration SCell in TDD CA, a regional mapping may be used based on the PCell UL/DL configuration. Since the PCell configuration is fixed, the regional mapping is fixed and may be applied to any TDD UL/DL configurations of a dynamic UL/DL reconfiguration cell. If regional mapping is employed, each UL subframe on the PCell may be associated with a set of subframes on an SCell. This set may be referred to as a mapping region of a UL subframe. A mapping region may include DL, UL or flexible subframes on an SCell. With this implementation, the PCell UL/DL configuration is a virtual reference UL/DL configuration for a dynamic UL/DL reconfiguration SCell, and no extra DL-reference UL/DL configuration may be needed for the dynamic UL/DL reconfiguration SCell.

In another TDD CA scenario, the PCell is a dynamic UL/DL reconfiguration cell and an SCell is a regular TDD cell with fixed UL/DL allocation. The DL-reference UL/DL configuration of the PCell may be the DL-reference UL/DL configuration of the dynamic UL/DL reconfiguration cell, which may be the same or different from the first (e.g., default) UL/DL configuration of the dynamic UL/DL reconfiguration PCell. Therefore, this implementation differs from Release-11. For an SCell, the DL-reference UL/DL configuration of the serving cell is determined based on the pair formed by the PCell UL/DL configuration and an SCell UL/DL configuration, where the PCell UL/DL configuration is replaced by the DL-reference configuration of the dynamic UL/DL reconfiguration PCell.

In one implementation involving a dynamic UL/DL reconfiguration PCell in TDD CA, several UL/DL configurations may be configured for the PCell. Among these cells, a TDD UL/DL configuration with minimum UL allocation (e.g., maximum DL allocation) may be derived and used as the DL-reference UL/DL configuration of the PCell. The DL-reference UL/DL configuration may be denoted as the first reference UL/DL configuration. The DL-reference UL/DL configuration of a dynamic UL/DL reconfiguration cell (e.g., the first reference UL/DL configuration of the PCell) may be used as the cell UL/DL configuration of the dynamic UL/DL reconfiguration PCell.

In another implementation involving a dynamic UL/DL reconfiguration PCell in TDD CA, the UL/DL configuration of the PCell may be signaled for a UL/DL reconfiguration. The new UL/DL configuration may be applied on the PCell after the transition. Therefore, a UE always has a current UL/DL configuration (e.g., the actual UL/DL configuration) in use. Since the current UL/DL configuration is known to both eNB and the UE, the PDSCH HARQ-ACK association and timing may follow the current UL/DL configuration of the PCell. In other words, the DL-reference UL/DL configuration of a dynamic UL/DL reconfiguration PCell may be the current UL/DL configuration of the dynamic UL/DL reconfiguration PCell. It should be noted that because the dynamic UL/DL reconfiguration PCell may change UL/DL configurations, the current UL/DL configuration may differ from a first (e.g., default) UL/DL configuration.

In yet another implementation involving a dynamic UL/DL reconfiguration PCell in TDD CA, a fixed UL/DL configuration may be used as the DL-reference UL/DL configuration for the PCell. For example, if the dynamic UL/DL reconfiguration PCell has 5 ms periodicity, the TDD configuration 2 may be used as the DL-reference UL/DL configuration. If the dynamic UL/DL reconfiguration PCell has 10 ms periodicity, then TDD configuration 5 may be used as the DL-reference UL/DL configuration.

In yet another TDD CA scenario, both the PCell and the SCell are dynamic UL/DL reconfiguration-capable cells. In this scenario, the DL-reference configuration of the PCell should be the DL-reference configuration of the dynamic UL/DL reconfiguration PCell, which may be the same or different from the first (e.g., default) UL/DL configuration of the dynamic UL/DL reconfiguration PCell. This is different from Release-11. For an SCell, the DL-reference UL/DL configuration of the serving cell is determined based on the pair formed by the PCell UL/DL configuration and the SCell UL/DL configuration, where the PCell UL/DL configuration is replaced by the DL-reference UL/DL configuration of the dynamic UL/DL reconfiguration PCell, and the SCell UL/DL configuration is replaced by the DL-reference configuration of the dynamic UL/DL reconfiguration SCell. The DL-reference UL/DL configuration of a dynamic UL/DL reconfiguration cell may be the reference UL/DL configuration with minimum UL allocation, or the current UL/DL configuration applied in a dynamic UL/DL reconfiguration cell, or a fixed UL/DL configuration, as discussed above.

One example of cell UL/DL configurations and UE behaviors for TDD carrier aggregation in accordance with the systems and methods described herein is illustrated in Table (3). A cell (e.g., legacy TDD cell) may have a first UL/DL configuration (F) only, defined by a configuration setting {F}. A cell (e.g., dynamic UL/DL reconfiguration cell) may have a first UL/DL configuration and additional information (e.g., additional reconfiguration information) as defined by a configuration setting set {F, X}. The additional information X is defined as information that enables dynamic UL/DL reconfiguration or information that enables having a flexible subframe in the cell. Even if a UE is configured with one or more serving cells with the additional information X, the UE may be further configured not to apply the additional information X. Then, the UE may follow behavior of a Release-11 UE. It should be noted that implementations that do not apply the additional information X may not be shown in the examples (illustrated in Table (3), for instance).

The additional information X may be signaling of an additional UL/DL configuration (e.g., by a combination with the first UL/DL configuration and defining a range of UL/DL configurations to which the cell can be reconfigured), multiple UL/DL configurations (e.g., a range of UL/DL configurations to which the cell can be reconfigured), signaling of a new UL/DL configuration to which the cell may be reconfigured (e.g., the current UL/DL configuration), etc. Function f(F, X) is the function to decide a UL/DL configuration that is used for a DL-reference UL/DL configuration (e.g., Rp, Rsi, Dp, Dsi). f may or may not use F because the first UL/DL configuration may not be used to derive the DL-reference UL/DL configuration.

TABLE (3)

The following is a behavior of a UE configured with dynamic UL/DL reconfiguration.
If a UE is configured with one serving cell,
    For the PCell
        If the PCell is a cell configured with {Fp} only,
            DASp=d(Fp)
        End if
        If the PCell is a cell configured with {Fp, Xp},
            Rp=f(Fp, Xp)
            DASp=d(Rp)
        End if
    End for
End if
If a UE is configured with more than one serving cell,
    If any of the serving cells are not configured with Xp or Xsi,
        If the UL/DL configurations of all serving cells are the same {Fp(=Fsi)},
            DASp=DASsi=d(Fp)
        End if
        If at least two serving cells have different UL/DL configurations,
            For the PCell
                Dp=Fp
                Rp=Dp
                DASp=d(Rp)
            End for
            For an SCell i
                Dp=Fp
                Dsi=Fsi
                Rsi=r(Dp, Dsi)
                DASsi=d(Rsi)
            End for TABLE (3)-continued End if
    End if
    If any of the serving cells are configured with Xp or Xsi,
        For the PCell
            If the PCell is a cell configured with {Fp} only,
                Rp=Fp
                DASp=d(Rp)
            End if
            If the PCell is a UL/DL cell configured with {Fp, Xp},
                Rp= f(Fp, Xp)
                DASp=d(Rp)
            End if
        End for
        For an SCell i
            If the SCell is configured with {Fsi} only,
                Dp=Rp, where Rp is defined above for the PCell
                Dsi=Fsi
            End if
            If the SCell is a cell configured with {Fsi, Xsi},
                Dp=Rp, where Rp is defined above for the PCell
                Dsi=f(Fsi, Xsi)
            End if
            Rsi = r(Dp, Dsi)
            DASsi=d(Rsi)
        End for
    End if
End if
The following is the behavior of a legacy UE or a Release-12 and beyond UE that is not configured to support eIMTA.
If a UE is configured with one serving cell,
    For the PCell
        DASp=d(Fp)
    End for
End if
If a UE is configured with more than one serving cell,
    If the UL/DL configurations of all serving cells are the same {Fp(=Fsi)}, DASp=DASsi=d(Fp)
    End if
    If at least two serving cells have different UL/DL configurations,
        For the PCell
            Dp=Fp
            Rp=Dp
            DASp=d(Rp)
        End for
        For an SCell i
            Dp=Fp
            Dsi=Fsi
            Rsi=r(Dp, Dsi)
            DASsi=d(Rsi)
        End for
    End if
End if In Table (3), DAS is a downlink association set, which is an output of Table (2) (from Table 10.1.3.1-1 of 3GPP TS 36.213), and decided by DAS=d(z), where z is an input (e.g., a UL/DL configuration) of Table (2) and d is the function to decide DAS. If a UE is configured with one serving cell without additional information that enables dynamic UL/DL reconfiguration, z is a first UL/DL configuration of the primary cell. If a UE is configured with more than one serving cell and the UL/DL configurations of all serving cells are the same and if any of the serving cells are not configured with the additional information, z is a first UL/DL configuration of the primary cell. If a UE is configured with more than one serving cell and at least two serving cells have different UL/DL configurations and if any of the serving cells are not configured with the additional information, z is a DL-reference UL/DL configuration of each serving cell. D is a UL/DL configuration that is used for an input for r(x, y). D is a temporary parameter for deriving the DL-reference UL/DL configuration of a cell in carrier aggregation. For a primary cell (PCell), Fp is a first UL/DL configuration of a primary cell, Xp is additional information for the primary cell that enables dynamic UL/DL reconfiguration, DASp is a downlink association set of the primary cell and Dp is an input x for r(x, y).

For a secondary cell (SCell) #i, Fsi is a first UL/DL configuration of a secondary cell #i, Xsi is additional information for a secondary cell #i that enables dynamic UL/DL reconfiguration, DAS si is a downlink association set of a secondary cell #i, and Dsi is an input y for r(x, y). Therefore, Rp is the DL-reference UL/DL configuration of a primary cell in CA as an input z for d(z). Rsi is the DL-reference UL/DL configuration of a secondary cell #i in CA as an input z for d(z). Rsi=r(x, y), where r is the function to decide the DL-reference UL/DL configuration of a secondary cell #i in CA based on Table (1), where x is a PCell UL/DL configuration (Dp) and y is the SCell UL/DL configuration (Dsi).

In a case where any of the serving cells are not configured with the additional information that enables dynamic UL/DL reconfiguration, Dp is a PCell UL/DL configuration that is a first UL/DL configuration of a primary cell and Dsi is an SCell UL/DL configuration that is a first UL/DL configuration of the secondary cell.

In another case where any of the serving cells are configured with the additional information that enables dynamic UL/DL reconfiguration, if a primary cell is configured with Xp, then Dp is a UL/DL configuration {Rp}, which is determined by f(Fp, Xp). Furthermore, in this case, if a primary cell is not configured with Xp, then Dp is the first UL/DL configuration of the primary cell {Fp}. Additionally, in this case, if a serving cell #i is configured with Xsi, then Dsi is a UL/DL configuration, which is determined by f(Fsi, Xsi). Furthermore, in this case, if a serving cell #i is not configured with Xsi, then Dsi is a first UL/DL configuration of the serving cell #i. If a serving cell is a primary cell and if the serving cell is not configured with Xp, then z is a first UL/DL configuration of the primary cell. If a serving cell is a primary cell and if the serving cell is configured with Xp, then z is a UL/DL configuration (e.g., a DL-reference UL/DL configuration Rp}, which is determined by f(Fp, Xp). If a serving cell #i is a secondary cell, then z is Rsi which is determined r(Dp, Dsi).

Various examples of the systems and methods disclosed herein are now described with reference to the Figures, where like reference numbers may indicate functionally similar elements. The systems and methods as generally described and illustrated in the Figures herein could be arranged and designed in a wide variety of different implementations. Thus, the following more detailed description of several implementations, as represented in the Figures, is not intended to limit scope, as claimed, but is merely representative of the systems and methods.

FIG. 1 is a block diagram illustrating one configuration of one or more eNBs 160 and one or more UEs 102 in which systems and methods for feedback reporting may be implemented. The one or more UEs 102 communicate with one or more eNBs 160 using one or more antennas 122a-n. For example, a UE 102 transmits electromagnetic signals to the eNB 160 and receives electromagnetic signals from the eNB 160 using the one or more antennas 122a-n. The eNB 160 communicates with the UE 102 using one or more antennas 180a-n.

The UE 102 and the eNB 160 may use one or more channels 119, 121 to communicate with each other. For example, a UE 102 may transmit information or data to the eNB 160 using one or more uplink channels 121. Examples of uplink channels 121 include a PUCCH and a PUSCH, etc. The one or more eNBs 160 may also transmit information or data to the one or more UEs 102 using one or more downlink channels 119, for instance. Examples of downlink channels 119 include a PDCCH, a PDSCH, etc. Other kinds of channels may be used.

Each of the one or more UEs 102 may include one or more transceivers 118, one or more demodulators 114, one or more decoders 108, one or more encoders 150, one or more modulators 154, a data buffer 104 and a UE operations module 124. For example, one or more reception and/or transmission paths may be implemented in the UE 102. For convenience, only a single transceiver 118, decoder 108, demodulator 114, encoder 150 and modulator 154 are illustrated in the UE 102, though multiple parallel elements (e.g., transceivers 118, decoders 108, demodulators 114, encoders 150 and modulators 154) may be implemented.

The transceiver 118 may include one or more receivers 120 and one or more transmitters 158. The one or more receivers 120 may receive signals from the eNB 160 using one or more antennas 122a-n. For example, the receiver 120 may receive and downconvert signals to produce one or more received signals 116. The one or more received signals 116 may be provided to a demodulator 114. The one or more transmitters 158 may transmit signals to the eNB 160 using one or more antennas 122a-n. For example, the one or more transmitters 158 may upconvert and transmit one or more modulated signals 156.

The demodulator 114 may demodulate the one or more received signals 116 to produce one or more demodulated signals 112. The one or more demodulated signals 112 may be provided to the decoder 108. The UE 102 may use the decoder 108 to decode signals. The decoder 108 may produce one or more decoded signals 106, 110. For example, a first UE-decoded signal 106 may comprise received payload data, which may be stored in a data buffer 104. A second UE-decoded signal 110 may comprise overhead data and/or control data. For example, the second UE-decoded signal 110 may provide data that may be used by the UE operations module 124 to perform one or more operations.

As used herein, the term "module" may mean that a particular element or component may be implemented in hardware, software or a combination of hardware and software. However, it should be noted that any element denoted as a "module" herein may alternatively be implemented in hardware. For example, the UE operations module 124 may be implemented in hardware, software or a combination of both.

In general, the UE operations module 124 may enable the UE 102 to communicate with the one or more eNBs 160. The UE operations module 124 may include one or more of a UE serving cell configuration module 128, a UE DL-reference UL/DL configuration determination module 130 and a UE PDSCH HARQ-ACK module 132.

It should be noted that in some implementations, the UE 102 may include built-in support for dynamic UL/DL reconfiguration. A UE 102 may have different behaviors depending on whether the UE 102 includes support for dynamic UL/DL reconfiguration. For example, a Release-12 UE 102 may support eIMTA (e.g., a Release-12 UE 102 may support dynamic UL/DL reconfiguration). However, a legacy (e.g., Release-11) UE 102 may not support eIMTA. Therefore, a UE 102 may not need to check on its own capabilities (e.g., support for dynamic UL/DL reconfiguration) when being configured with a serving cell.

The UE serving cell configuration module 128 may receive signaling to configure the UE 102 with one or more serving cells. As described above, a serving cell may be a cell of which the UE 102 is aware and is allowed by an eNB 160 to transmit or receive information. A serving cell may or may not support dynamic UL/DL reconfiguration. The signaling may indicate a first UL/DL configuration for a serving cell. A serving cell may also be configured with additional reconfiguration information. In some implementations, the additional reconfiguration information may enable dynamic UL/DL reconfiguration. For example, the additional reconfiguration information may enable having a flexible subframe. Examples of the additional reconfiguration information may include an additional UL/DL configuration, multiple UL/DL configurations, a current UL/DL configuration (after a reconfiguration, for example) and/or a periodicity (e.g., a minimum number of uplink allocations based on the periodicity). In one case, the UE serving cell configuration module 128 may receive signaling to configure the UE 102 with a single serving cell that supports dynamic UL/DL reconfiguration.

In another case, the UE serving cell configuration module 128 may receive additional signaling to configure the UE 102 with at least one additional serving cell. A UE 102 that is configured with more than one serving cell may perform carrier aggregation (CA). In a case with more than one serving cell, a serving cell may be a primary cell (PCell) or a secondary cell (SCell). Each of the multiple serving cells may have a separate first UL/DL configuration. Furthermore, each first UL/DL configuration may indicate the same or different UL/DL configuration.

The UE DL-reference UL/DL configuration determination module 130 may determine a DL-reference UL/DL configuration for the one or more serving cells. As described above, PDSCH and PUSCH timing associations may be based on separate reference UL/DL configurations. For example, the UEs 102 and the eNB 160 may be configured to allow dynamic UL/DL reconfiguration based on traffic adaptation (besides the UL/DL reconfiguration as in Release 8, 9, 10 and 11 specifications that requires a system information change). For instance, the UE 102 may utilize a DL-reference UL/DL configuration for PDSCH HARQ-ACK association and a UL-reference UL/DL configuration for PUSCH scheduling and PUSCH HARQ-ACK association, while the UE 102 has knowledge of a first (e.g., default) UL/DL configuration. The DL-reference UL/DL configuration for PDSCH HARQ-ACK association may or may not be the same as the first UL/DL configuration. It should be noted that the eNB 160 may signal the first UL/DL configuration to the UE 102.

In one scenario, the UE 102 may be configured with one serving cell. The UE DL-reference UL/DL configuration determination module 130 may determine the DL-reference UL/DL configuration in different ways depending on whether the UE 102 supports dynamic UL/DL reconfiguration. For example, if the UE 102 supports dynamic UL/DL reconfiguration, then the UE DL-reference UL/DL configuration determination module 130 may determine the DL-reference UL/DL configuration based on a UL/DL configuration and additional reconfiguration information, as described in more detail below in connection with FIG. 2. If the UE 102 does not support dynamic UL/DL reconfiguration, then the first UL/DL configuration of the serving cell may be used for the DL-reference UL/DL configuration.

In another scenario, the UE 102 may be configured with more than one serving cell. In this scenario, a serving cell may be a primary cell (PCell) or a secondary cell (SCell). If the serving cell is a PCell and both the PCell and the UE 102 support dynamic UL/DL reconfiguration, then the UE DL-reference UL/DL configuration determination module 130 may determine the DL-reference UL/DL configuration based on a first UL/DL configuration of the PCell and additional reconfiguration information of the PCell, as described in more detail below in connection with FIG. 2. If the PCell supports dynamic UL/DL reconfiguration, but the UE 102 does not support dynamic UL/DL reconfiguration, then a first UL/DL configuration may be used as the DL-reference UL/DL configuration. Alternatively, if the PCell does not support dynamic UL/DL reconfiguration, then a current UL/DL configuration may be used as the DL-reference UL/DL configuration.

If the serving cell is an SCell, then the UE DL-reference UL/DL configuration determination module 130 may determine the DL-reference UL/DL configuration based on a pair formed by a PCell UL/DL configuration and an SCell UL/DL configuration. The PCell UL/DL configuration may be determined as described above (e.g., the PCell UL/DL configuration may be the DL-reference UL/DL configuration of the PCell). If the SCell and the UE 102 support dynamic UL/DL reconfiguration, then the SCell UL/DL configuration may be based on a first UL/DL configuration of the serving cell and the additional reconfiguration information of the serving cell, as described in more detail below in connection with FIG. 2. If the SCell supports dynamic UL/DL reconfiguration, but the UE 102 does not support dynamic UL/DL reconfiguration, then a first UL/DL configuration may be used as the SCell UL/DL configuration. Alternatively, if the SCell does not support dynamic UL/DL reconfiguration, then a current SCell UL/DL configuration may be used as the SCell UL/DL configuration.

Upon determining the PCell UL/DL configuration and the SCell UL/DL configuration, the UE DL-reference UL/DL configuration determination module 130 may determine whether the PCell UL/DL configuration and the SCell UL/DL configuration contain different UL/DL configurations. If the PCell UL/DL configuration and the SCell UL/DL configuration contain different UL/DL configurations, then the UE DL-reference UL/DL configuration determination module 130 may determine the DL-reference UL/DL configuration of the SCell based on Table (1) above. If the PCell UL/DL configuration and the SCell UL/DL configuration are the same UL/DL configuration, then the SCell UL/DL configuration may be used as the DL-reference UL/DL configuration.

It should be noted that if no serving cell is configured with (e.g., supports) dynamic UL/DL reconfiguration, then the UE 102 may follow legacy (e.g., Release-11) behavior. For example, if the TDD UL/DL configuration of all the configured serving cells is the same, the first UL/DL configuration of all serving cells may be used for determining a downlink association set that may be used for the HARQ-ACK for PDSCH for the serving cell. If the TDD UL/DL configurations of at least two configured serving cells are different, then the first UL/DL configurations of some or all of the configured serving cells are used for determining the DL-reference UL/DL configuration for each serving cell and downlink association set that may be used for the HARQ-ACK for PDSCH for the serving cell.

The UE PDSCH HARQ-ACK module 132 may send PDSCH HARQ-ACK information based on the DL-reference UL/DL configuration. For example, the UE PDSCH HARQ-ACK module 132 may send PDSCH HARQ-ACK information in the uplink subframes corresponding to the set of downlink subframe associations associated with the DL-reference UL/DL configuration. For instance, the UE PDSCH HARQ-ACK module 132 may inform the transmitter(s) 158 when or when not to send PDSCH HARQ-ACK information based on the DL-reference UL/DL configuration.

The UE operations module 124 may provide information 148 to the one or more receivers 120. For example, the UE operations module 124 may inform the receiver(s) 120 when to receive retransmissions.

The UE operations module 124 may provide information 138 to the demodulator 114. For example, the UE operations module 124 may inform the demodulator 114 of a modulation pattern anticipated for transmissions from the eNB 160.

The UE operations module 124 may provide information 136 to the decoder 108. For example, the UE operations module 124 may inform the decoder 108 of an anticipated encoding for transmissions from the eNB 160.

The UE operations module 124 may provide information 142 to the encoder 150. The information 142 may include data to be encoded and/or instructions for encoding. For example, the UE operations module 124 may instruct the encoder 150 to encode transmission data 146 and/or other information 142. The other information 142 may include PDSCH HARQ-ACK information.

The encoder 150 may encode transmission data 146 and/or other information 142 provided by the UE operations module 124. For example, encoding the data 146 and/or other information 142 may involve error detection and/or correction coding, mapping data to space, time and/or frequency resources for transmission, multiplexing, etc. The encoder 150 may provide encoded data 152 to the modulator 154.

The UE operations module 124 may provide information 144 to the modulator 154. For example, the UE operations module 124 may inform the modulator 154 of a modulation type (e.g., constellation mapping) to be used for transmissions to the eNB 160. The modulator 154 may modulate the encoded data 152 to provide one or more modulated signals 156 to the one or more transmitters 158.

The UE operations module 124 may provide information 140 to the one or more transmitters 158. This information 140 may include instructions for the one or more transmitters 158. For example, the UE operations module 124 may instruct the one or more transmitters 158 when to transmit a signal to the eNB 160. In some configurations, this may be based on the DL-reference UL/DL configuration (determined by the UE DL-reference UL/DL configuration determination module 130, for example). For instance, the one or more transmitters 158 may transmit during a UL subframe. The one or more transmitters 158 may upconvert and transmit the modulated signal(s) 156 to one or more eNBs 160.

The eNB 160 may include one or more transceivers 176, one or more demodulators 172, one or more decoders 166, one or more encoders 109, one or more modulators 113, a data buffer 162 and an eNB operations module 182. For example, one or more reception and/or transmission paths may be implemented in an eNB 160. For convenience, only a single transceiver 176, decoder 166, demodulator 172, encoder 109 and modulator 113 are illustrated in the eNB 160, though multiple parallel elements (e.g., transceivers 176, decoders 166, demodulators 172, encoders 109 and modulators 113) may be implemented.

The transceiver 176 may include one or more receivers 178 and one or more transmitters 117. The one or more receivers 178 may receive signals from the UE 102 using one or more antennas 180*a-n*. For example, the receiver 178 may receive and downconvert signals to produce one or more received signals 174. The one or more received signals 174 may be provided to a demodulator 172. The one or more transmitters 117 may transmit signals to the UE 102 using one or more antennas 180*a-n*. For example, the one or more transmitters 117 may upconvert and transmit one or more modulated signals 115.

The demodulator 172 may demodulate the one or more received signals 174 to produce one or more demodulated signals 170. The one or more demodulated signals 170 may be provided to the decoder 166. The eNB 160 may use the decoder 166 to decode signals. The decoder 166 may produce one or more decoded signals 164, 168. For example, a first eNB-decoded signal 164 may comprise received payload data, which may be stored in a data buffer 162. A second eNB-decoded signal 168 may comprise overhead data and/or control data. For example, the second eNB-decoded signal 168 may provide data (e.g., PDSCH HARQ-ACK information) that may be used by the eNB operations module 182 to perform one or more operations.

In general, the eNB operations module 182 may enable the eNB 160 to communicate with the one or more UEs 102. The eNB operations module 182 may include one or more of an eNB serving cell configuration module 196, an eNB DL-reference UL/DL configuration determination module 198 and an eNB PDSCH HARQ-ACK module 107.

The eNB serving cell configuration module 196 may send signaling to configure the UE 102 with a serving cell. As described above, a serving cell may or may not support dynamic UL/DL reconfiguration. A serving cell may or may not support dynamic UL/DL reconfiguration. The signaling may indicate a first UL/DL configuration for a serving cell. A serving cell may also be configured with additional reconfiguration information. In some implementations, the additional reconfiguration information may enable dynamic UL/DL reconfiguration.

In one implementation, the eNB serving cell configuration module 196 may send signaling to configure the UE 102 with a single serving cell that supports dynamic UL/DL reconfiguration. In another implementation, the eNB serving cell configuration module 196 may send additional signaling to configure the UE 102 with at least one additional serving cell. For example, one eNB 160 may be associated with one serving cell, and another eNB 160 may be associated with another serving cell. In another example, a single eNB 160 may be associated with multiple serving cells. A UE 102 that is configured with more than one serving cell may perform carrier aggregation (CA). In an implementation with more than one serving cell, a serving cell may be a primary cell (PCell) or a secondary cell (SCell).

The eNB DL-reference UL/DL configuration determination module 198 may determine a DL-reference UL/DL configuration for the one or more serving cells. As described above, PDSCH and PUSCH timing associations may be based on separate reference UL/DL configurations. For example, the UEs 102 and the eNB 160 may be configured to allow dynamic UL/DL reconfiguration based on traffic adaptation (besides the UL/DL reconfiguration as in Release 8, 9, 10 and 11 specifications that requires a system information change). For instance, the eNB 160 may utilize a DL-reference UL/DL configuration for PDSCH HARQ-ACK association and a UL-reference UL/DL configuration for PUSCH scheduling and PUSCH HARQ-ACK association with the UE 102, while the UE 102 has knowledge of a first (e.g., default) UL/DL configuration. The DL reference UL/DL configuration for PDSCH HARQ-ACK association may or may not be the same as the first UL/DL configuration. It should be noted that the eNB 160 may signal the first UL/DL configuration to the UE 102.

In some cases, the eNB 160 may transition operation between UL/DL configurations. For example, the eNB 160 may perform dynamic UL/DL reconfiguration by directing one or more UEs 102 to use a UL/DL configuration that is different from the first UL/DL configuration. Therefore, the current UL/DL configuration may be different than the first UL/DL configuration. The eNB DL-reference UL/DL configuration determination module 198 may determine a DL-reference UL/DL configuration that may be used to receive PDSCH HARQ-ACK information from the UE 102 upon dynamic UL/DL reconfiguration.

In one scenario, a UE 102 may be configured with one serving cell associated with the eNB 160. The eNB DL-reference UL/DL configuration determination module 198 may determine the DL-reference UL/DL configuration in different ways depending on whether the UE 102 supports dynamic UL/DL reconfiguration. For example, if the UE 102 supports dynamic UL/DL reconfiguration, then the eNB DL-reference UL/DL configuration determination module 198 may determine the DL-reference UL/DL configuration based on a first UL/DL configuration and additional reconfiguration information, as described in more detail below. If the UE 102 does not support dynamic UL/DL reconfiguration, then the first UL/DL configuration of the serving cell may be used for the DL-reference UL/DL configuration.

In another scenario, the UE 102 may be configured with more than one serving cell. In this scenario, a serving cell may be a primary cell (PCell) or a secondary cell (SCell). If the serving cell (associated with the eNB 160) is a PCell and both the PCell and the UE 102 support dynamic UL/DL reconfiguration, then the eNB DL-reference UL/DL configuration determination module 198 may determine the DL-reference UL/DL configuration based on a first UL/DL configuration and additional reconfiguration information, as described in more detail below. If the PCell supports dynamic UL/DL reconfiguration, but the UE 102 does not support dynamic UL/DL reconfiguration, then a first UL/DL configuration may be used as the DL-reference UL/DL configuration. Alternatively, if the PCell does not support dynamic UL/DL reconfiguration, then a current UL/DL configuration may be used as the DL-reference UL/DL configuration.

If the serving cell (associated with the eNB 160) is an SCell, then the eNB DL-reference UL/DL configuration determination module 198 may determine the DL-reference UL/DL configuration based on a pair formed by a PCell UL/DL configuration and an SCell UL/DL configuration. The PCell UL/DL configuration may be determined as described above (e.g., the PCell UL/DL configuration may be the DL-reference UL/DL configuration of the PCell). If the SCell and the UE 102 support dynamic UL/DL reconfiguration, then the SCell UL/DL configuration may be based on a first UL/DL configuration and additional reconfiguration information, as described in more detail below. If the SCell supports dynamic UL/DL reconfiguration, but the UE 102 does not support dynamic UL/DL reconfiguration, then a first UL/DL configuration may be used as the SCell UL/DL configuration. Alternatively, if the SCell does not support dynamic UL/DL reconfiguration, then a current SCell UL/DL configuration may be used as the SCell UL/DL configuration.

Upon determining the PCell UL/DL configuration and the SCell UL/DL configuration, the eNB DL-reference UL/DL configuration determination module 198 may determine whether the PCell UL/DL configuration and the SCell UL/DL configuration contain different UL/DL configurations. If the PCell UL/DL configuration and the SCell UL/DL configuration contain different UL/DL configurations, then the eNB DL-reference UL/DL configuration determination module 198 may determine the DL-reference UL/DL configuration of the SCell based on Table (1) above. If the PCell UL/DL configuration and the SCell UL/DL configuration are the same UL/DL configuration, then the SCell UL/DL configuration may be used as the DL-reference UL/DL configuration.

It should be noted that if no serving cell is configured with dynamic UL/DL reconfiguration, then the eNB 160 may follow legacy (e.g., Release-11) behavior. Therefore, if no serving cell supports dynamic UL/DL reconfiguration, then the downlink association set used for receiving the PDSCH HARQ-ACK information may be based on the first UL/DL configuration of the serving cell.

The eNB PDSCH HARQ-ACK module 107 may receive PDSCH HARQ-ACK information based on the DL-reference UL/DL configuration. For example, the eNB PDSCH HARQ-ACK module 107 may receive PDSCH HARQ-ACK information in the uplink subframes corresponding to the set of downlink subframe associations associated with the DL-reference UL/DL configuration. For instance, the eNB PDSCH HARQ-ACK module 107 may inform the receivers(s) 178 when or when not to receive PDSCH HARQ-ACK information based on the DL-reference UL/DL configuration.

The eNB operations module 182 may provide information 190 to the one or more receivers 178. For example, the eNB operations module 182 may inform the receiver(s) 178 when or when not to receive PDSCH HARQ-ACK information based on the set of downlink subframe associations corresponding to the DL-reference UL/DL configuration.

The eNB operations module 182 may provide information 188 to the demodulator 172. For example, the eNB operations module 182 may inform the demodulator 172 of a modulation pattern anticipated for transmissions from the UE(s) 102.

The eNB operations module 182 may provide information 186 to the decoder 166. For example, the eNB operations module 182 may inform the decoder 166 of an anticipated encoding for transmissions from the UE(s) 102.

The eNB operations module 182 may provide information 101 to the encoder 109. The information 101 may include data to be encoded and/or instructions for encoding. For example, the eNB operations module 182 may instruct the encoder 109 to encode transmission data 105 and/or other information 101.

The encoder 109 may encode transmission data 105 and/or other information 101 provided by the eNB operations module 182. For example, encoding the data 105 and/or other information 101 may involve error detection and/or correction coding, mapping data to space, time and/or frequency resources for transmission, multiplexing, etc. The encoder 109 may provide encoded data 111 to the modulator 113. The transmission data 105 may include network data to be relayed to the UE 102.

The eNB operations module 182 may provide information 103 to the modulator 113. This information 103 may include instructions for the modulator 113. For example, the eNB operations module 182 may inform the modulator 113 of a modulation type (e.g., constellation mapping) to be used for transmissions to the UE(s) 102. The modulator 113 may modulate the encoded data 111 to provide one or more modulated signals 115 to the one or more transmitters 117.

The eNB operations module 182 may provide information 192 to the one or more transmitters 117. This information 192 may include instructions for the one or more transmitters 117. For example, the eNB operations module 182 may instruct the one or more transmitters 117 when to (or when not to) transmit a signal to the UE(s) 102. In some implementations, this may be based on a DL-reference UL/DL configuration. The one or more transmitters 117 may upconvert and transmit the modulated signal(s) 115 to one or more UEs 102.

It should be noted that a DL subframe may be transmitted from the eNB 160 to one or more UEs 102 and that a UL subframe may be transmitted from one or more UEs 102 to the eNB 160. Furthermore, both the eNB 160 and the one or more UEs 102 may transmit data in a standard special subframe.

It should also be noted that one or more of the elements or parts thereof included in the eNB(s) 160 and UE(s) 102 may be implemented in hardware. For example, one or more of these elements or parts thereof may be implemented as a chip, circuitry or hardware components, etc. It should also be noted that one or more of the functions or methods described herein may be implemented in and/or performed using hardware. For example, one or more of the methods described herein may be implemented in and/or realized using a chipset, an application-specific integrated circuit (ASIC), a large-scale integrated (LSI) circuit or integrated circuit, etc.

Figure 2:
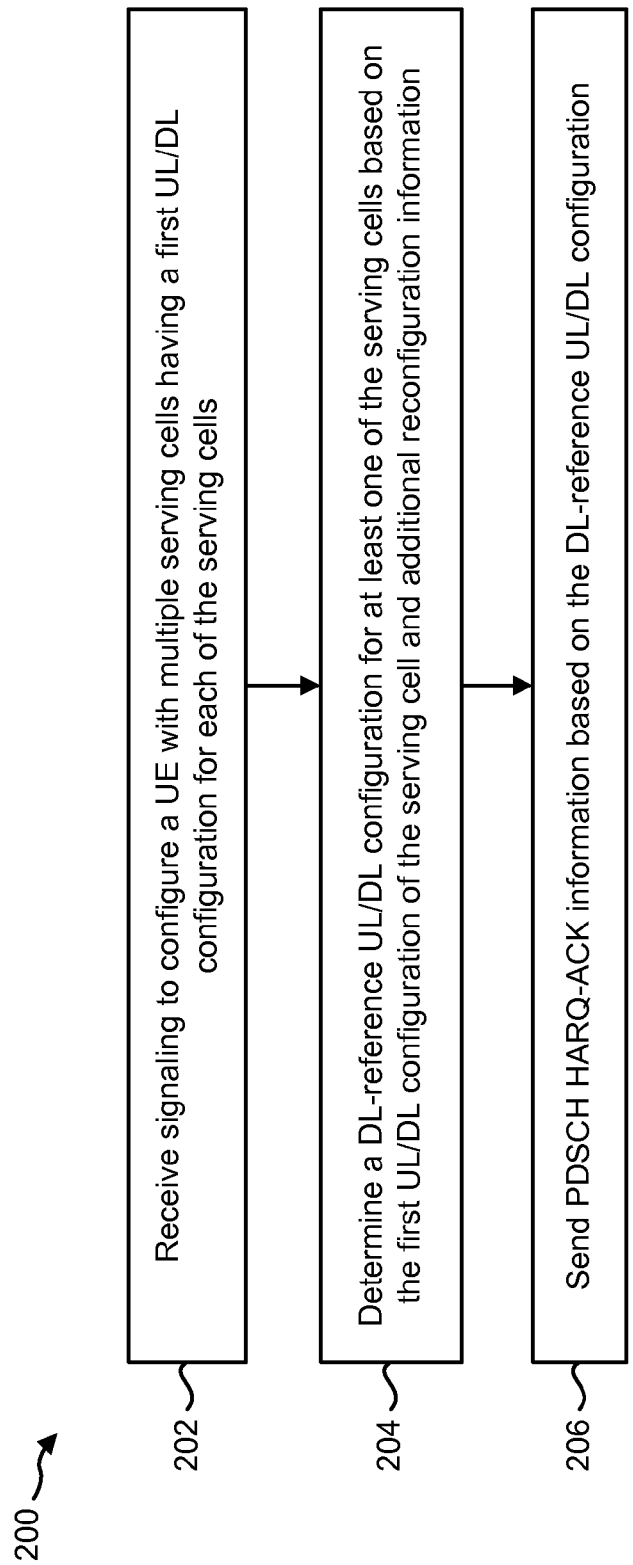
FIG. 2 is a flow diagram illustrating one implementation of a method for sending feedback by a UE.

FIG. 2 is a flow diagram illustrating one implementation of a method 200 for sending feedback by a UE 102. The UE 102 may be configured with dynamic UL/DL reconfiguration (e.g., eIMTA support). The UE 102 may receive 202 signaling to configure the UE 102 with one or multiple serving cells. As described above, a serving cell may be a cell of which the UE 102 is aware and is allowed by an eNB 160 to transmit or receive information. The UE 102 may receive 202 the signaling to configure the UE 102 with multiple serving cells from an eNB 160. The signaling may indicate a first UL/DL configuration for a serving cell. Each of the multiple serving cells may have a separate first UL/DL configuration. Furthermore, each first UL/DL configuration may indicate the same or different UL/DL configuration. A first UL/DL configuration may be signaled in an SIB.

A first UL/DL configuration may be used as the default TDD UL/DL configuration of a serving cell. A serving cell may also be configured with additional reconfiguration information. A serving cell may be configured (e.g., switched) to another UL/DL configuration that is different from the first UL/DL configuration. The current UL/DL configuration may also be referred to as the actual UL/DL configuration. A serving cell may be configured with multiple TDD UL/DL configurations and have multiple reference TDD UL/DL configurations. In some implementations, the additional reconfiguration information may enable dynamic UL/DL reconfiguration. Examples of the additional reconfiguration information may include an additional UL/DL configuration, multiple UL/DL configurations, a current UL/DL configuration (after a reconfiguration, for example) and/or a periodicity (e.g., a minimum number of uplink allocations based on the periodicity). As described above, a UE 102 may support dynamic UL/DL reconfiguration, or the UE 102 may be a legacy UE 102 that may not support dynamic UL/DL reconfiguration.

If the UE 102 is configured with the one or multiple serving cells and at least one of the serving cells is configured with additional reconfiguration information that enables dynamic UL/DL reconfiguration, then the UE 102 may determine 204 a DL-reference UL/DL configuration for at least one of the serving cells based on the first UL/DL configuration of the serving cell and the additional reconfiguration information of the serving cell. In one implementation, the DL-reference UL/DL configuration may be determined 204 based on a first reference UL/DL configuration. For example, the UE 102 may receive 202 signaling with a UL/DL reconfiguration range. A DL-reference UL/DL configuration may then be determined 204 based on the UL/DL reconfiguration range. This DL-reference UL/DL configuration may be referred to as the first reference UL/DL configuration. The DL-reference UL/DL configuration may be a UL/DL configuration with only fixed UL allocations among all configured UL/DL configurations.

If all configurations have the same periodicity, among these configurations, the UL/DL configuration with minimum UL allocation (e.g., maximum DL allocation) may be used as the DL-reference UL/DL configuration (e.g., the first reference UL/DL configuration). If the configurations have different periodicity, the first reference UL/DL configuration is a configuration defined by the fixed UL allocations among all configured configurations. Therefore, the DL-reference UL/DL configuration may be the same as one of the configured UL/DL configurations, or the DL-reference UL/DL configuration may be different from the configured UL/DL configurations. The first reference UL/DL configuration (e.g., the DL-reference UL/DL configuration) may be selected from the seven existing TDD UL/DL configurations.

With this implementation, the PDSCH HARQ-ACK association and timing may follow the first reference UL/DL configuration (e.g., the DL-reference UL/DL configuration) of the serving cell. Because all flexible subframes are included in the subset of DL subframes of the DL-reference UL/DL configuration, the DL-reference UL/DL configuration may be used regardless of the actual flexible subframe allocation.

In another implementation, the DL-reference UL/DL configuration may be determined 204 based on a current UL/DL configuration. For example, the UL/DL configuration of the serving cell may be signaled upon a UL/DL reconfiguration. The new UL/DL configuration may be applied after a UL/DL configuration transition (e.g., reconfiguration). Therefore, the UE 102 may always have a current UL/DL configuration (e.g., the actual UL/DL configuration in use). The current UL/DL configuration may be the same or different from the first (e.g., default) UL/DL configuration. The current UL/DL configuration may be any configuration within the UL/DL reconfiguration range. Since the current UL/DL configuration is known to both eNB 160 and the UE 102, the PDSCH HARQ-ACK association and timing may follow the current UL/DL configuration of the serving cell. In other words, the DL-reference UL/DL configuration of the serving cell may be the current UL/DL configuration of the serving cell.

In yet another implementation, the DL-reference UL/DL configuration may be determined 204 based on a periodicity of UL/DL configurations. For example, a fixed UL/DL configuration may be used as the DL-reference UL/DL configuration for the first cell. If the serving cell is an SCell that has 5 millisecond (ms) periodicity, then TDD UL/DL configuration 2 may be used as the DL-reference UL/DL configuration. If a serving cell is an SCell that has 10 ms periodicity, then TDD UL/DL configuration 5 may be used as the DL-reference UL/DL configuration.

If the UE 102 does not support dynamic UL/DL reconfiguration, then the UE 102 may determine 204 a DL-reference UL/DL configuration based on a first UL/DL configuration. A UE 102 that does not support dynamic UL/DL reconfiguration may be a legacy UE 102 (e.g., Release-8, 9, 10 and 11 UE 102) or a Release-12 and beyond UE 102 that is configured not to use eIMTA capability (e.g., the eIMTA capability is set to FALSE). In other words, if the UE 102 does not support dynamic UL/DL reconfiguration, but the serving cell does support dynamic UL/DL reconfiguration, the UE 102 may determine 204 the DL-reference UL/DL configuration based on a default UL/DL configuration of the serving cell. In this way, the UE 102 may treat the serving cell as a legacy TDD cell with a default TDD UL/DL configuration.

The UE 102 may send 206 PDSCH HARQ-ACK information based on the DL-reference UL/DL configuration. For example, the UE 102 may send 206 PDSCH HARQ-ACK information to the eNB 160 in the uplink subframes corresponding to the set of downlink subframe associations associated with the DL-reference UL/DL configuration.

Figure 3:
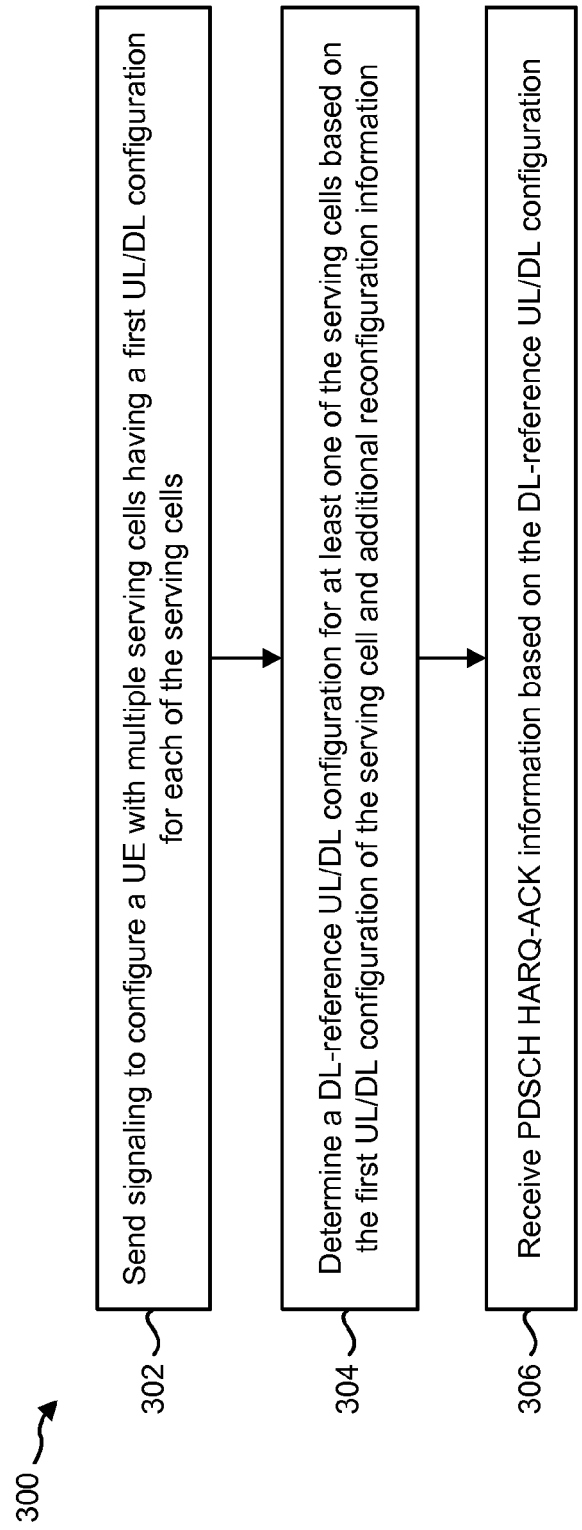
FIG. 3 is a flow diagram illustrating one implementation of a method for receiving feedback by an eNB.

FIG. 3 is a flow diagram illustrating one implementation of a method 300 for receiving feedback by an eNB 160. The eNB 160 may send 302 signaling to configure a UE 102 with multiple serving cells. The signaling may indicate a first UL/DL configuration for a serving cell. Each of the multiple serving cells may have a separate first UL/DL configuration. Furthermore, each first UL/DL configuration may indicate the same or different UL/DL configuration. A first UL/DL configuration may be signaled in an SIB.

A first UL/DL configuration may be used as the default TDD UL/DL configuration of a serving cell. A serving cell may also be configured with additional reconfiguration information. A serving cell may be configured (e.g., switched) to another UL/DL configuration that is different from the first UL/DL configuration. The current UL/DL configuration may also be referred to as the actual UL/DL configuration. A serving cell may be configured with multiple TDD UL/DL configurations and have multiple reference TDD UL/DL configurations. In some implementations, the additional reconfiguration information may enable dynamic UL/DL reconfiguration. Examples of the additional reconfiguration information may include an additional UL/DL configuration, multiple UL/DL configurations, a current UL/DL configuration (after a reconfiguration, for example) and/or a periodicity (e.g., a minimum number of uplink allocations based on the periodicity).

If at least one of the serving cells is configured with additional reconfiguration information that enables dynamic UL/DL reconfiguration, then the eNB 160 may determine 304 a DL-reference UL/DL configuration based the first UL/DL configuration of the serving cell and the additional reconfiguration information of the serving cell. In one implementation, the DL-reference UL/DL configuration may be determined 304 based on a first reference UL/DL configuration. For example, the eNB 160 may send 304 signaling with a UL/DL reconfiguration range to the UE 102. A DL-reference UL/DL configuration may then be determined 304 based on the UL/DL reconfiguration range as described above in connection with FIG. 2.

In another implementation, the DL-reference UL/DL configuration may be determined 304 based on a current UL/DL configuration. This may be accomplished as described above in connection with FIG. 2.

In yet another implementation, the DL-reference UL/DL configuration may be determined 304 based on a periodicity of fixed UL/DL configurations. This may also be accomplished as described above in connection with FIG. 2.

If the UE 102 does not support dynamic UL/DL reconfiguration, then the eNB 160 may determine 304 a DL-reference UL/DL configuration based on a first UL/DL configuration. A UE 102 that does not support dynamic UL/DL reconfiguration may be a legacy UE 102 (e.g., Release-8, 9, 10 and 11 UE 102) or a Release-12 and beyond UE 102 that is configured not to use eIMTA capability (e.g., the eIMTA capability is set to FALSE). In other words, if the UE 102 does not support dynamic UL/DL reconfiguration, but the serving cell does support dynamic UL/DL reconfiguration, the eNB 160 may determine 304 the DL-reference UL/DL configuration based on a default UL/DL configuration of the serving cell. In an implementation where the eNB 160 is connected to multiple UEs 102, it is up to the eNB 160 to avoid conflicts in flexible subframes between the legacy UEs 102 and dynamic UL/DL reconfiguration-capable UEs 102.

The eNB 160 may receive 306 PDSCH HARQ-ACK information based on the DL-reference UL/DL configuration. For example, the eNB 160 may receive 306 PDSCH HARQ-ACK information in the uplink subframes corresponding to the set of downlink subframe associations associated with the DL-reference UL/DL configuration.

Figure 4:
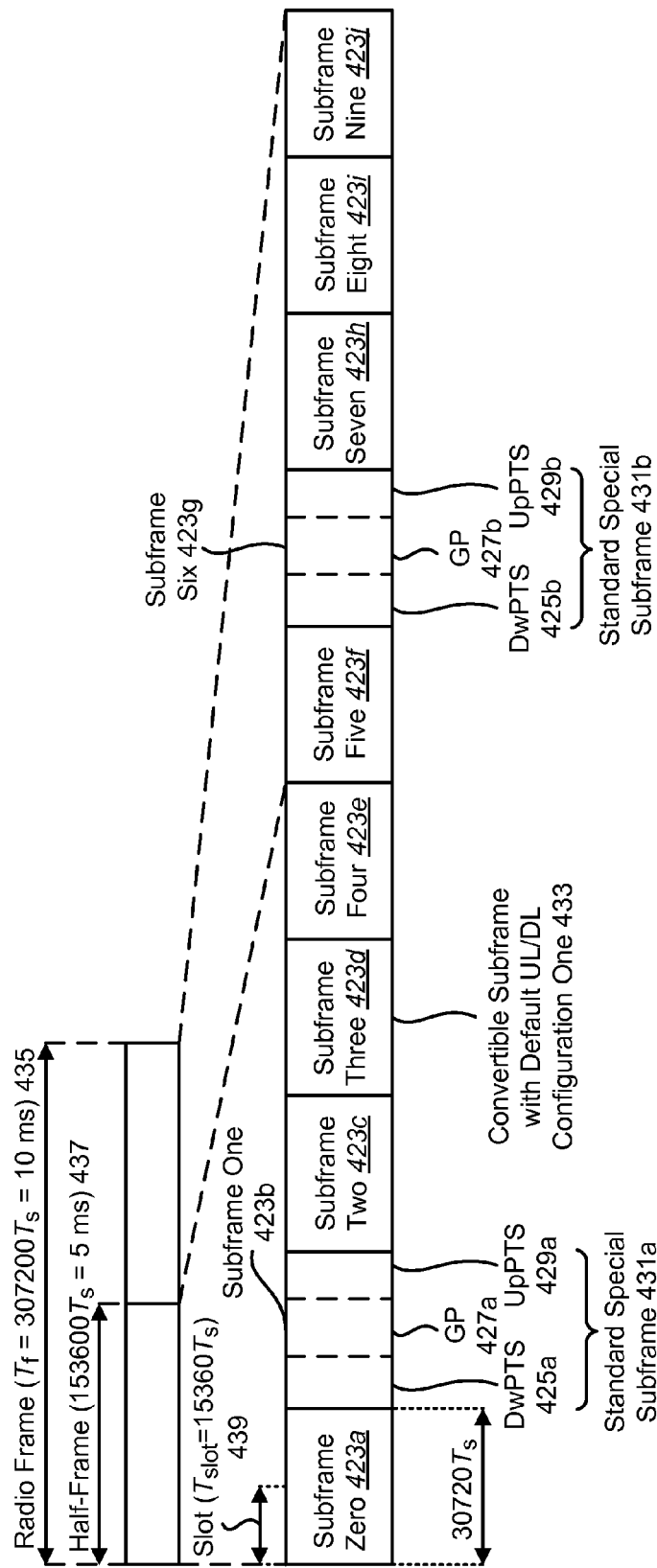
FIG. 4 is a diagram illustrating one example of a radio frame that may be used in accordance with the systems and methods disclosed herein.

FIG. 4 is a diagram illustrating one example of a radio frame 435 that may be used in accordance with the systems and methods disclosed herein. This radio frame 435 structure illustrates a TDD structure. Each radio frame 435 may have a length of $T_f = 307200 \cdot T_s = 10$ ms, where $T_f$ is a radio frame 435 duration and $T_s$ is a time unit equal to $$\frac{1}{(15000 \times 2048)}$$

seconds. The radio frame 435 may include two half-frames 437, each having a length of $153600 \cdot T_s = 5$ ms. Each half-frame 437 may include five subframes 423a-e, 423f-j each having a length of $30720 \cdot T_s = 1$ ms.

TDD UL/DL configurations 0-6 are given below in Table (4) (from Table 4.2-2 in 3GPP TS 36.211). UL/DL configurations with both 5 ms and 10 ms downlink-to-uplink switch-point periodicity may be supported. In particular, seven UL/DL configurations are specified in 3GPP specifications, as shown in Table (4) below. In Table (4), "D" denotes a downlink subframe, "S" denotes a special subframe and "U" denotes a UL subframe.

TABLE (4)

| TDD UL/DL Configuration Number | Downlink-to-Uplink Switch-Point Periodicity | Subframe Number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

In Table (4) above, for each subframe in a radio frame, "D" indicates that the subframe is reserved for downlink transmissions, "U" indicates that the subframe is reserved for uplink transmissions and "S" indicates a special subframe with three fields: a downlink pilot time slot (DwPTS), a guard period (GP) and an uplink pilot time slot (UpPTS). The length of DwPTS and UpPTS is given in Table (5) (from Table 4.2-1 of 3GPP TS 36.211) subject to the total length of DwPTS, GP and UpPTS being equal to $30720 \cdot T_s = 1$ ms. Table (5) illustrates several configurations of (standard) special subframes. Each subframe i is defined as two slots, 2i and 2i+1 of length $T_{slot} = 15360 \cdot T_s = 0.5$ ms in each subframe. In Table (5), "cyclic prefix" is abbreviated as "CP" and "configuration" is abbreviated as "Config" for convenience.

TABLE (5)

| Special Subframe Config | Normal CP in downlink | | | Extended CP in downlink | | |
|---|---|---|---|---|---|---|
| | | UpPTS | | | UpPTS | |
| | DwPTS | Normal CP in uplink | Extended CP in uplink | DwPTS | Normal CP in uplink | Extended CP in uplink |
| 0 | $6592 \cdot T_s$ | $2192 \cdot T_s$ | $2560 \cdot T_s$ | $7680 \cdot T_s$ | $2192 \cdot T_s$ | $2560 \cdot T_s$ |
| 1 | $19760 \cdot T_s$ | | | $20480 \cdot T_s$ | | |
| 2 | $21952 \cdot T_s$ | | | $23040 \cdot T_s$ | | |
| 3 | $24144 \cdot T_s$ | | | $25600 \cdot T_s$ | | |
| 4 | $26336 \cdot T_s$ | | | $7680 \cdot T_s$ | $4384 \cdot T_s$ | $5120 \cdot T_s$ |
| 5 | $6592 \cdot T_s$ | $4384 \cdot T_s$ | $5120 \cdot T_s$ | $20480 \cdot T_s$ | | |
| 6 | $19760 \cdot T_s$ | | | $23040 \cdot T_s$ | | |
| 7 | $21952 \cdot T_s$ | | | — | — | — |
| 8 | $24144 \cdot T_s$ | | | — | — | — |

UL/DL configurations with both 5 ms and 10 ms downlink-to-uplink switch-point periodicity are supported. In the case of 5 ms downlink-to-uplink switch-point periodicity, the special subframe exists in both half-frames. In the case of 10 ms downlink-to-uplink switch-point periodicity, the special subframe exists in the first half-frame only. Subframes 0 and 5 and DwPTS may be reserved for downlink transmission. UpPTS and the subframe immediately following the special subframe may be reserved for uplink transmission.

In accordance with the systems and methods disclosed herein, some types of subframes 423 that may be used include a downlink subframe, an uplink subframe and a special subframe 431. In the example illustrated in FIG. 4, which has a 5 ms periodicity, two standard special subframes 431a-b are included in the radio frame 435.

The first special subframe 431a includes a downlink pilot time slot (DwPTS) 425a, a guard period (GP) 427a and an uplink pilot time slot (UpPTS) 429a. In this example, the first standard special subframe 431a is included in subframe one 423b. The second standard special subframe 431b includes a downlink pilot time slot (DwPTS) 425b, a guard period (GP) 427b and an uplink pilot time slot (UpPTS) 429b. In this example, the second standard special subframe 431b is included in subframe six 423g. The length of the DwPTS 425a-b and UpPTS 429a-b may be given by Table 4.2-1 of 3GPP TS 36.211 (illustrated in Table (5) above) subject to the total length of each set of DwPTS 425, GP 427 and UpPTS 429 being equal to $30720 \cdot T_s = 1$ ms.

Each subframe i 423a-j (where i denotes a subframe ranging from subframe zero 423a (e.g., 0) to subframe nine 423j (e.g., 9) in this example) is defined as two slots, 2i and 2i+1 of length $T_{slot} = 15360 \cdot T_s = 0.5$ ms in each subframe 423. For example, subframe zero (e.g., 0) 423a may include two slots, including a first slot 439.

UL/DL configurations with both 5 ms and 10 ms downlink-to-uplink switch-point periodicity may be used in accordance with the systems and methods disclosed herein. FIG. 4 illustrates one example of a radio frame 435 with 5 ms switch-point periodicity. In the case of 5 ms downlink-to-uplink switch-point periodicity, each half-frame 437 includes a standard special subframe 431a-b. In the case of 10 ms downlink-to-uplink switch-point periodicity, a special subframe may exist in the first half-frame 437 only.

Subframe zero (e.g., 0) 423a and subframe five (e.g., 5) 423f and DwPTS 425a-b may be reserved for DL transmission. The UpPTS 429a-b and the subframe(s) immediately following the standard special subframe(s) 431a-b (e.g., subframe two 423c and subframe seven 423h) may be reserved for UL transmission. In one implementation, in a case where multiple cells are aggregated, a UE 102 may assume the same UL/DL configuration across all the cells and that the guard period (GP) of the special subframe(s) in the different cells have an overlap of at least $1456 \cdot T_s$.

One or more of the subframes 423 illustrated in FIG. 4 may be convertible, depending on the UL/DL reconfiguration range. Assuming a default UL/DL configuration 1 as given in Table (4) above, for example, subframe three (e.g., 3) 423d may be a convertible subframe 433 (from UL-to-DL, for instance).

Figure 5:
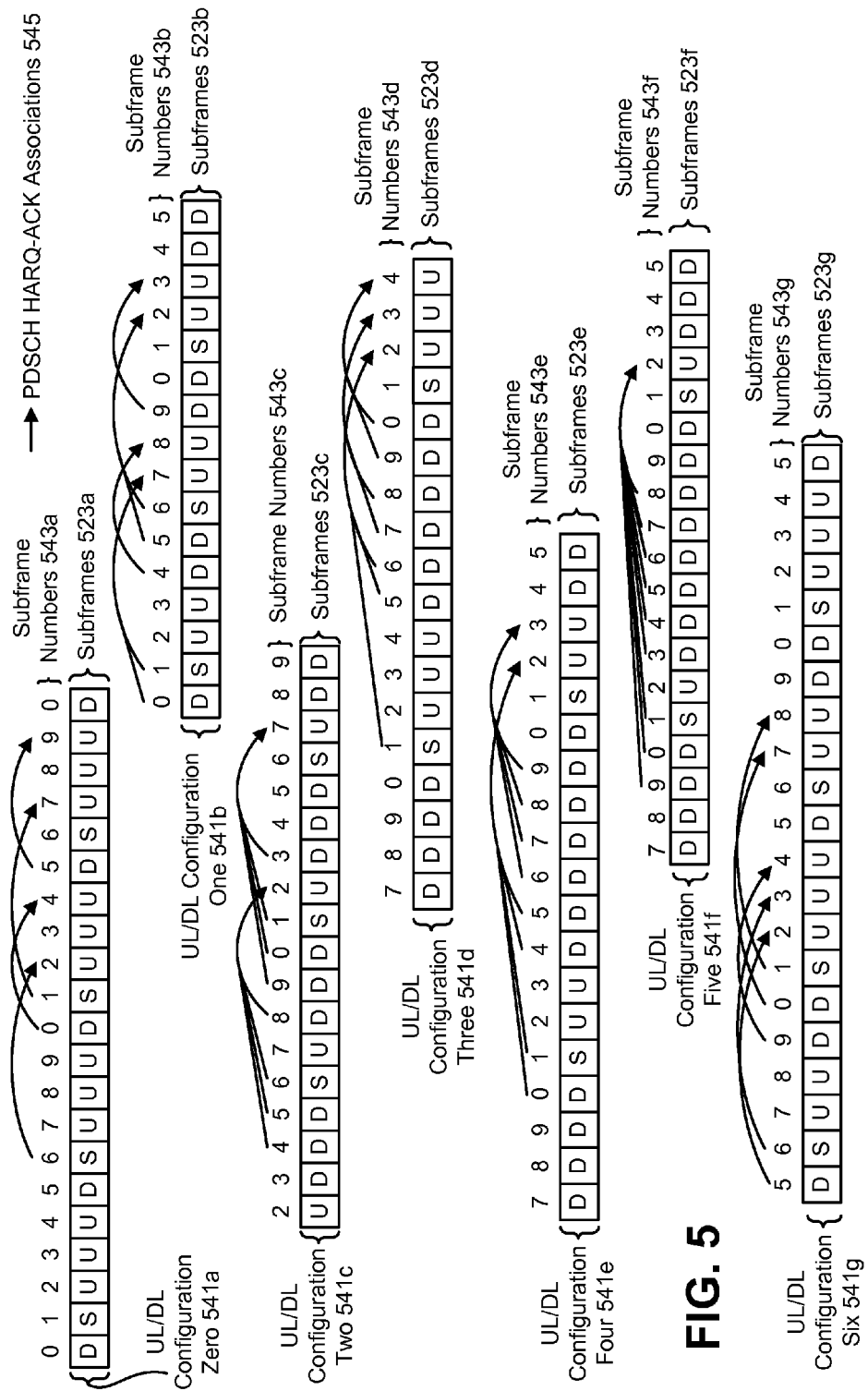
FIG. 5 is a diagram illustrating some time-division duplexing (TDD) uplink/downlink (UL/DL) configurations in accordance with the systems and methods described herein.

FIG. 5 is a diagram illustrating some TDD UL/DL configurations 541a-g in accordance with the systems and methods described herein. In particular, FIG. 5 illustrates UL/DL configuration zero 541a (e.g., "UL/DL configuration 0") with subframes 523a and subframe numbers 543a, UL/DL configuration one 541b (e.g., "UL/DL configuration 1") with subframes 523b and subframe numbers 543b, UL/DL configuration two 541c (e.g., "UL/DL configuration 2") with subframes 523c and subframe numbers 543c and UL/DL configuration three 541d (e.g., "UL/DL configuration 3") with subframes 523d and subframe numbers 543d. FIG. 5 also illustrates UL/DL configuration four 541e (e.g., "UL/DL configuration 4") with subframes 523e and subframe numbers 543e, UL/DL configuration five 541f (e.g., "UL/DL configuration 5") with subframes 523f and subframe numbers 543f and UL/DL configuration six 541g (e.g., "UL/DL configuration 6") with subframes 523g and subframe numbers 543g.

Furthermore, FIG. 5 illustrates PDSCH HARQ-ACK associations 545 (e.g., PDSCH HARQ-ACK feedback on PUCCH or PUSCH associations). The PDSCH HARQ-ACK associations 545 may indicate HARQ-ACK reporting subframes corresponding to subframes for PDSCH transmissions (e.g., subframes in which PDSCH transmissions may be sent and/or received). It should be noted that some of the radio frames illustrated in FIG. 5 have been truncated for convenience.

The systems and methods described herein may be applied to one or more of the UL/DL configurations 541a-g illustrated in FIG. 5. For example, one or more PDSCH HARQ-ACK associations 545 corresponding to one of the UL/DL configurations 541a-g illustrated in FIG. 5 may be applied to communications between a UE 102 and eNB 160. For example, a DL-reference UL/DL configuration 541 may be determined (e.g., assigned to, applied to) for a serving cell. In this case, PDSCH HARQ-ACK associations 545 may specify PDSCH HARQ-ACK timing (e.g., a HARQ-ACK reporting subframe) for HARQ-ACK feedback transmissions corresponding to the serving cell.

A PDSCH HARQ-ACK association 545 may specify a particular (PDSCH HARQ-ACK) timing for receiving HARQ-ACK information corresponding to a PDSCH. A PDSCH HARQ-ACK association 545 may specify a reporting subframe in which the UE 102 reports (e.g., transmits) the HARQ-ACK information corresponding to the PDSCH to the eNB 160. The reporting subframe may be determined based on the subframe that includes the PDSCH sent by the eNB 160.

Figure 6:
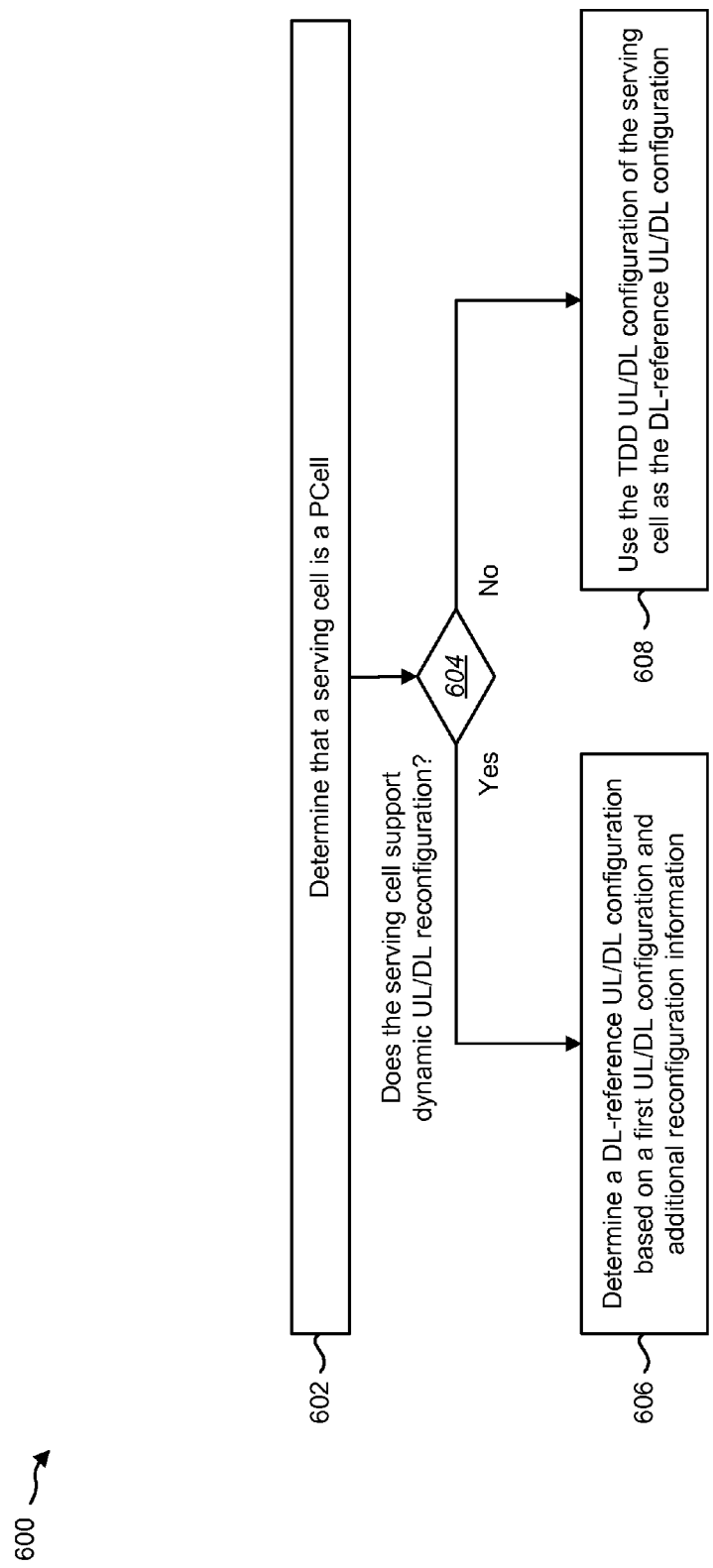
FIG. 6 is a flow diagram illustrating one implementation of a method for determining a DL-reference UL/DL configuration for a primary cell (PCell)

FIG. 6 is a flow diagram illustrating one implementation of a method 600 for determining a DL-reference UL/DL configuration for a primary cell (PCell). The method 600 may be performed by a communication device associated with a serving cell. The communication device may be configured to support dynamic UL/DL reconfiguration, (e.g., eIMTA). The communication device may be a UE 102 configured with the serving cell and one or more additional serving cells, which may include a PCell and one or more SCells. The multiple serving cells may be used for carrier aggregation (CA). The communication device may additionally or alternatively be an eNB 160 associated with the serving cell. In the implementation described in FIG. 6, the serving cell is a PCell and the UE 102 supports dynamic UL/DL reconfiguration. The implementation described in FIG. 6 may be only applied in a case where any of the serving cells are configured with additional reconfiguration information that enables dynamic UL/DL reconfiguration or that enables having a flexible subframe in the cell.

The communication device may determine 602 that the serving cell is a PCell. For example, the eNB 160 may configure the serving cell as a PCell. The UE 102 may receive an indication from the eNB 160 indicating that the serving cell is a PCell.

The communication device may determine 604 whether the serving cell supports dynamic UL/DL reconfiguration. If the serving cell supports dynamic UL/DL reconfiguration, then the communication device may determine 606 the DL-reference UL/DL configuration based on a first UL/DL configuration of the serving cell and additional reconfiguration information of the serving cell. This may be accomplished as described in connection with FIG. 2. For example, in one implementation, the DL-reference UL/DL configuration may be determined 606 based on a first reference UL/DL configuration. In another implementation, the DL-reference UL/DL configuration may be determined 606 based on a current UL/DL configuration. In yet another implementation, the DL-reference UL/DL configuration may be determined 606 based on a periodicity of fixed UL/DL configurations.

If the communication device determines 604 that the serving cell does not support dynamic UL/DL reconfiguration, then the communication device may use 608 the TDD UL/DL configuration of the serving cell as the DL-reference UL/DL configuration. In other words, if the serving cell is operating as a legacy serving cell, then the currently used UL/DL configuration may be used 608 as the DL-reference UL/DL configuration. It should be noted that there may be only one configuration for a legacy cell.

It should be noted that the communication device may send or receive PDSCH HARQ-ACK information based on the DL-reference UL/DL configuration. For example, the UE 102 may send PDSCH HARQ-ACK information to the eNB 160 in the uplink subframes corresponding to the set of downlink subframe associations associated with the DL-reference UL/DL configuration.

Figure 7:
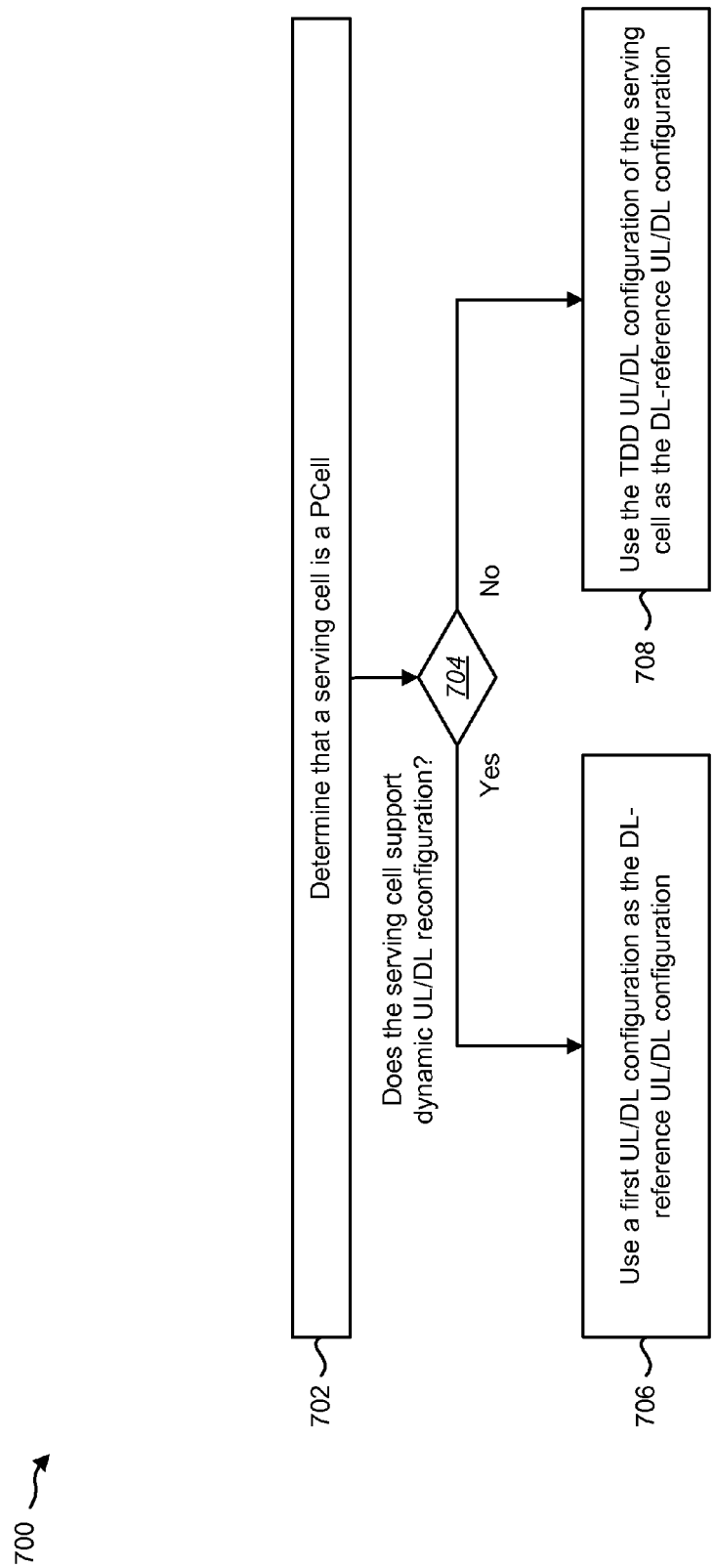
FIG. 7 is a flow diagram illustrating another implementation of a method for determining a DL-reference UL/DL configuration for a primary cell (PCell)

FIG. 7 is a flow diagram illustrating another implementation of a method 700 for determining a DL-reference UL/DL configuration for a primary cell (PCell). The method 700 may be performed by a communication device associated with a serving cell. The communication device may be a UE 102 configured with the serving cell and one or more additional serving cells, which may include a PCell and one or more SCells. The multiple serving cells may be used for carrier aggregation (CA). The communication device may additionally or alternatively be an eNB 160 associated with the serving cell. The communication device may not support eIMTA. For example, the communication device may be a legacy (e.g., Release-8, 9, 10 and 11) UE 102 or a Release-12 and beyond UE 102 that is configured not to use eIMTA capability (e.g., the eIMTA capability is set to FALSE). In this implementation, the serving cell is a PCell. Furthermore, the UE 102 in this implementation does not support dynamic UL/DL reconfiguration.

The communication device may determine 702 that the serving cell is a PCell. For example, the eNB 160 may configure the serving cell as a PCell. The UE 102 may receive an indication from the eNB 160 that the serving cell is a PCell.

The communication device may determine 704 whether the serving cell supports dynamic UL/DL reconfiguration. If the serving cell supports dynamic UL/DL reconfiguration and if the UE 102 is a Release-12 and beyond UE 102 that is configured not to use eIMTA capability, then the communication device may use 706 a first UL/DL configuration as the DL-reference UL/DL configuration. A legacy UE 102 that does not understand dynamic UL/DL reconfiguration signaling only receives the first PCell UL/DL configuration, and uses it as the PCell UL/DL configuration. In the case where the serving cell supports dynamic UL/DL reconfiguration, the current UL/DL configuration of the serving cell may not be the same as the first (e.g., default) UL/DL configuration. As discussed above, it is up to the eNB 160 to avoid conflicts in flexible subframes between the legacy and non-eIMTA supported UEs 102 and dynamic UL/DL reconfiguration-capable UEs 102. Therefore, the eNB 160 may set the first (e.g., default) UL/DL configuration as the UL/DL configuration with minimum UL allocation within the allowed UL/DL reconfiguration range.

If the communication device determines 704 that the serving cell does not support dynamic UL/DL reconfiguration or the UE 102 is a legacy UE 102 that does not understand dynamic UL/DL reconfiguration signaling, then the communication device may use 708 a current UL/DL configuration as the DL-reference UL/DL configuration. In other words, if the serving cell is operating as a legacy serving cell, then the currently configured TDD UL/DL configuration of the cell may be used 708 as the DL-reference UL/DL configuration.

It should be noted that the communication device may send or receive PDSCH HARQ-ACK information based on the DL-reference UL/DL configuration. For example, the UE 102 may send PDSCH HARQ-ACK information to the eNB 160 in the uplink subframes corresponding to the set of downlink subframe associations associated with the DL-reference UL/DL configuration.

Figure 8:
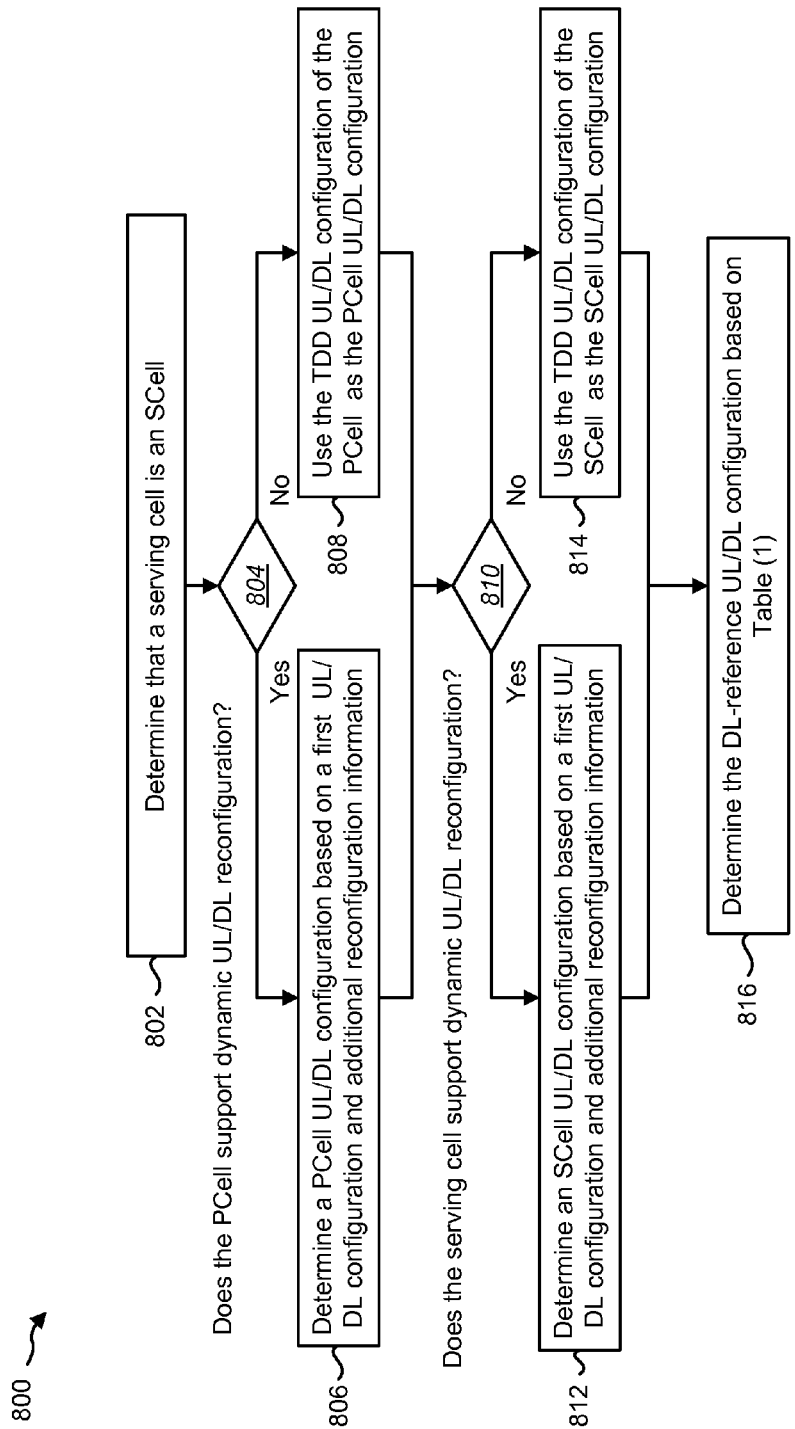
FIG. 8 is a flow diagram illustrating one implementation of a method for determining a DL-reference UL/DL configuration for a secondary cell (SCell)

FIG. 8 is a flow diagram illustrating one implementation of a method 800 for determining a DL-reference UL/DL configuration for a secondary cell (SCell). The method 800 may be performed by a communication device associated with a serving cell. The communication device may be a UE 102 configured with the serving cell and one or more additional serving cells, which may include a PCell and one or more SCells. The communication device may be configured to support dynamic UL/DL configuration (e.g., eIMTA). The multiple serving cells may be used for carrier aggregation (CA). The communication device may additionally or alternatively be an eNB 160 associated with the serving cell. In this implementation, the serving cell is an SCell and the UE 102 supports dynamic UL/DL reconfiguration. The implementation described in FIG. 8 may be only applied in a case where any of the serving cells are configured with additional reconfiguration information that enables dynamic UL/DL reconfiguration or that enables having a flexible subframe in the cell.

The communication device may determine 802 that the serving cell is an SCell. For example, the eNB 160 may configure the serving cell as an SCell. The UE 102 may receive an indication from the eNB 160 indicating that the serving cell is an SCell. It should be noted that a "first UL/DL configuration" may denote a "default UL/DL configuration."

The communication device may determine 804 whether the PCell supports dynamic UL/DL reconfiguration. If the PCell supports dynamic UL/DL reconfiguration, then the communication device may determine 806 a PCell UL/DL configuration based on a first UL/DL configuration of the PCell and additional reconfiguration information of the PCell. This may be accomplished as described in connection with FIG. 2. For example, in one implementation, the PCell UL/DL configuration may be determined 806 based on a first reference UL/DL configuration. In another implementation, the PCell UL/DL configuration may be determined 806 based on a current PCell UL/DL configuration. In yet another implementation, the PCell UL/DL configuration may be determined 806 based on a periodicity of fixed UL/DL configurations.

If the communication device determines 804 that the PCell does not support dynamic UL/DL reconfiguration, then the communication device may use 808 the TDD UL/DL configuration of the PCell as the PCell UL/DL configuration. In other words, if the PCell is operating as a legacy serving cell, then the currently used UL/DL configuration of the PCell may be used 808 as the PCell UL/DL configuration.

The communication device may determine 810 whether the serving cell (e.g., the SCell) supports dynamic UL/DL reconfiguration. If the serving cell supports dynamic UL/DL reconfiguration, then the communication device may determine 812 the SCell UL/DL configuration based on a first UL/DL configuration and additional reconfiguration information of the serving cell. This may be accomplished as described in connection with FIG. 2. For example, in one implementation, the SCell UL/DL configuration may be determined 812 based on a first reference UL/DL configuration. In another implementation, the SCell UL/DL configuration may be determined 812 based on a current SCell UL/DL configuration. In yet another implementation, the SCell UL/DL configuration may be determined 812 based on a periodicity of fixed UL/DL configurations.

If the communication device determines 810 that the serving cell does not support dynamic UL/DL reconfiguration, then the communication device may use 814 the TDD UL/DL configuration of the SCell as the SCell UL/DL configuration. In other words, if the serving cell is operating as a legacy serving cell, then the currently used UL/DL configuration of the serving cell may be used 814 as the SCell UL/DL configuration.

The communication device may determine 816 the DL-reference UL/DL configuration of the SCell based on Table (1) above. It should be noted that the communication device may send or receive PDSCH HARQ-ACK information based on the DL-reference UL/DL configuration. For example, the UE 102 may send PDSCH HARQ-ACK information to the eNB 160 in the uplink subframes corresponding to the set of downlink subframe associations associated with the DL-reference UL/DL configuration.

Figure 9:
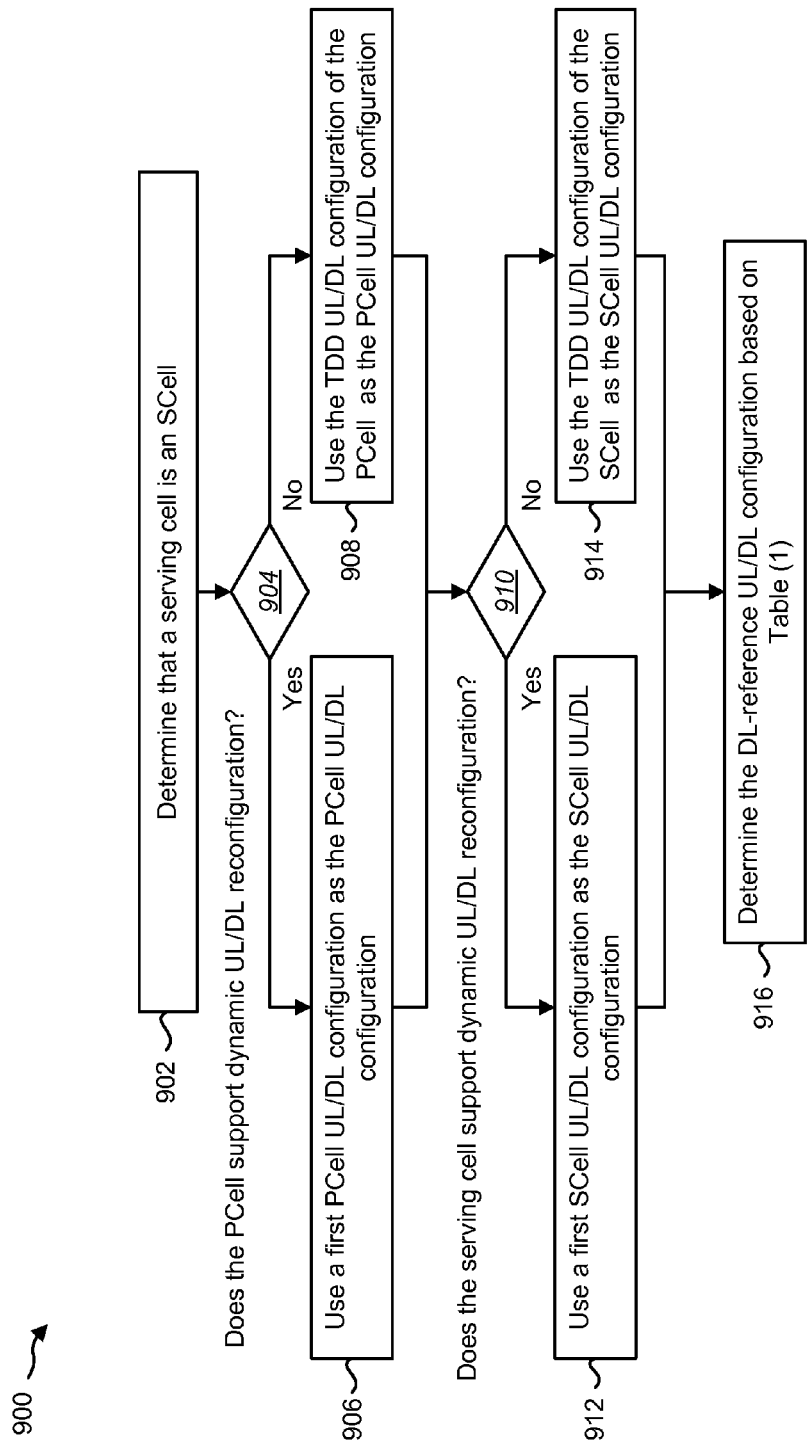
FIG. 9 is a flow diagram illustrating another implementation of a method for determining a DL-reference UL/DL configuration for a secondary cell (SCell)

FIG. 9 is a flow diagram illustrating another implementation of a method 900 for determining a DL-reference UL/DL configuration for a secondary cell (SCell). The method 900 may be performed by a communication device associated with a serving cell. The communication device may be a UE 102 configured with the serving cell and one or more additional serving cells, which may include a PCell and one or more SCells. The multiple serving cells may be used for carrier aggregation (CA). The communication device may not support eIMTA. For example, the communication device may be a legacy (e.g., Release-8, 9, 10 and 11) UE 102 or a Release-12 and beyond UE 102 that is configured not to use eIMTA capability (e.g., the eIMTA capability is set to FALSE). The communication device may also be an eNB 160 associated with the serving cell. In this implementation, the serving cell is an SCell and the UE 102 does not support dynamic UL/DL reconfiguration.

The communication device may determine 902 that the serving cell is an SCell. For example, the eNB 160 may configure the serving cell as an SCell. The UE 102 may receive an indication from the eNB 160 indicating that the serving cell is an SCell.

The communication device may determine 904 whether the PCell supports dynamic UL/DL reconfiguration. If the PCell supports dynamic UL/DL reconfiguration and if the UE 102 is a Release-12 and beyond UE 102 is configured not to use eIMTA capability, then the communication device may use 906 a first PCell UL/DL configuration as the PCell UL/DL configuration. A legacy UE 102 that does not understand dynamic UL/DL reconfiguration signaling only receives the first PCell UL/DL configuration and uses it as the PCell UL/DL configuration. It should be noted that in the case where the serving cell supports dynamic UL/DL reconfiguration, the current UL/DL configuration of the serving cell may not be the same as the first (e.g., default) UL/DL configuration. Therefore, the first PCell UL/DL configuration may or may not be the same as the current PCell UL/DL configuration.

If the communication device determines 904 that the PCell does not support dynamic UL/DL reconfiguration, then the communication device may use 908 the TDD PCell UL/DL configuration of the PCell as the PCell UL/DL configuration. In other words, if the PCell is operating as a legacy serving cell, then the currently used UL/DL configuration of the PCell may be used 908 as the PCell UL/DL configuration.

The communication device may determine 910 whether the serving cell (e.g., the SCell) supports dynamic UL/DL reconfiguration. If the serving cell supports dynamic UL/DL reconfiguration and if the UE 102 is a Release-12 and beyond UE 102 that is configured not to use eIMTA capability, then the communication device may use 912 a first SCell UL/DL configuration as the SCell UL/DL configuration. A legacy UE 102 that does not understand dynamic UL/DL reconfiguration signaling only receives the first SCell UL/DL configuration, and uses it as the SCell UL/DL configuration. As mentioned above, it should be noted that in the case where the serving cell supports dynamic UL/DL reconfiguration, the current UL/DL configuration of the serving cell may not be the same as the first (e.g., default) UL/DL configuration. Therefore, the first SCell UL/DL configuration may or may not be the same as the current SCell UL/DL configuration.

If the communication device determines 910 that the serving cell does not support dynamic UL/DL reconfiguration, then the communication device may use 914 the TDD UL/DL configuration of the SCell as the SCell UL/DL configuration. In other words, if the serving cell is operating as a legacy serving cell, then the currently used UL/DL configuration of the serving cell may be used 914 as the SCell UL/DL configuration.

The communication device may determine 916 the DL-reference UL/DL configuration of the SCell based on Table (1) above. It should be noted that the communication device may send or receive PDSCH HARQ-ACK information based on the DL-reference UL/DL configuration. For example, the UE 102 may send PDSCH HARQ-ACK information to the eNB 160 in the uplink subframes corresponding to the set of downlink subframe associations associated with the DL-reference UL/DL configuration.

Figure 10:
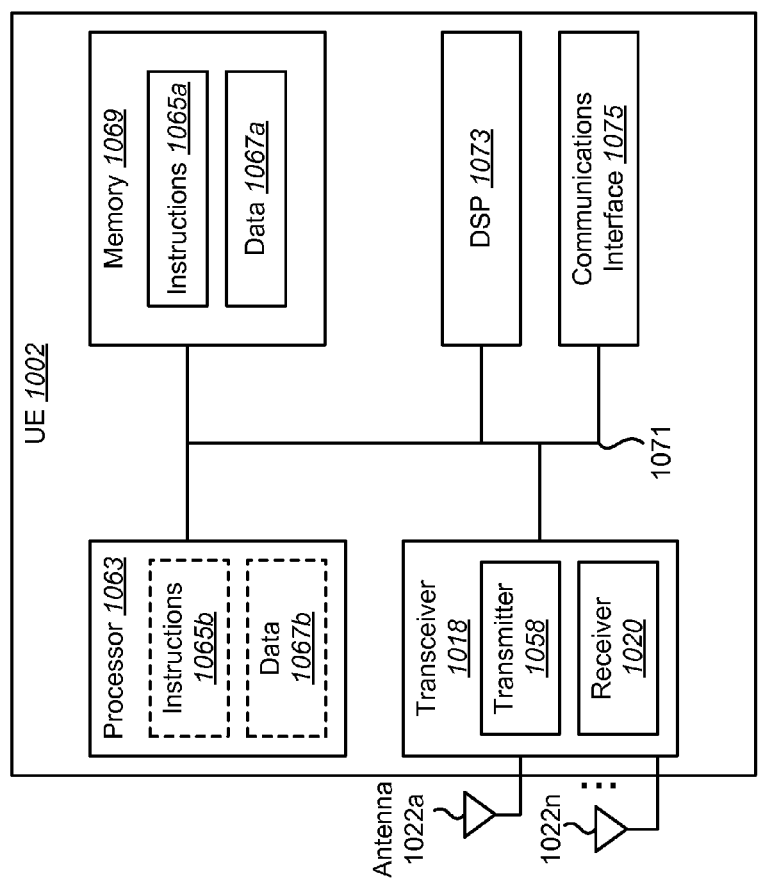
FIG. 10 illustrates various components that may be utilized in a UE.

FIG. 10 illustrates various components that may be utilized in a UE 1002. The UE 1002 described in connection with FIG. 10 may be implemented in accordance with the UE 102 described in connection with FIG. 1. The UE 1002 includes a processor 1063 that controls operation of the UE 1002. The processor 1063 may also be referred to as a central processing unit (CPU). Memory 1069, which may include read-only memory (ROM), random access memory (RAM), a combination of the two or any type of device that may store information, provides instructions 1065a and data 1067a to the processor 1063. A portion of the memory 1069 may also include non-volatile random access memory (NVRAM). Instructions 1065b and data 1067b may also reside in the processor 1063. Instructions 1065b and/or data 1067b loaded into the processor 1063 may also include instructions 1065a and/or data 1067a from memory 1069 that were loaded for execution or processing by the processor 1063. The instructions 1065b may be executed by the processor 1063 to implement one or more of the methods 200, 600, 700, 800 and 900 described above.

The UE 1002 may also include a housing that contains one or more transmitters 1058 and one or more receivers 1020 to allow transmission and reception of data. The transmitter(s) 1058 and receiver(s) 1020 may be combined into one or more transceivers 1018. One or more antennas 1022a-n are attached to the housing and electrically coupled to the transceiver 1018.

The various components of the UE 1002 are coupled together by a bus system 1071, which may include a power bus, a control signal bus and a status signal bus, in addition to a data bus. However, for the sake of clarity, the various buses are illustrated in FIG. 10 as the bus system 1071. The UE 1002 may also include a digital signal processor (DSP) 1073 for use in processing signals. The UE 1002 may also include a communications interface 1075 that provides user access to the functions of the UE 1002. The UE 1002 illustrated in FIG. 10 is a functional block diagram rather than a listing of specific components.

Figure 11:
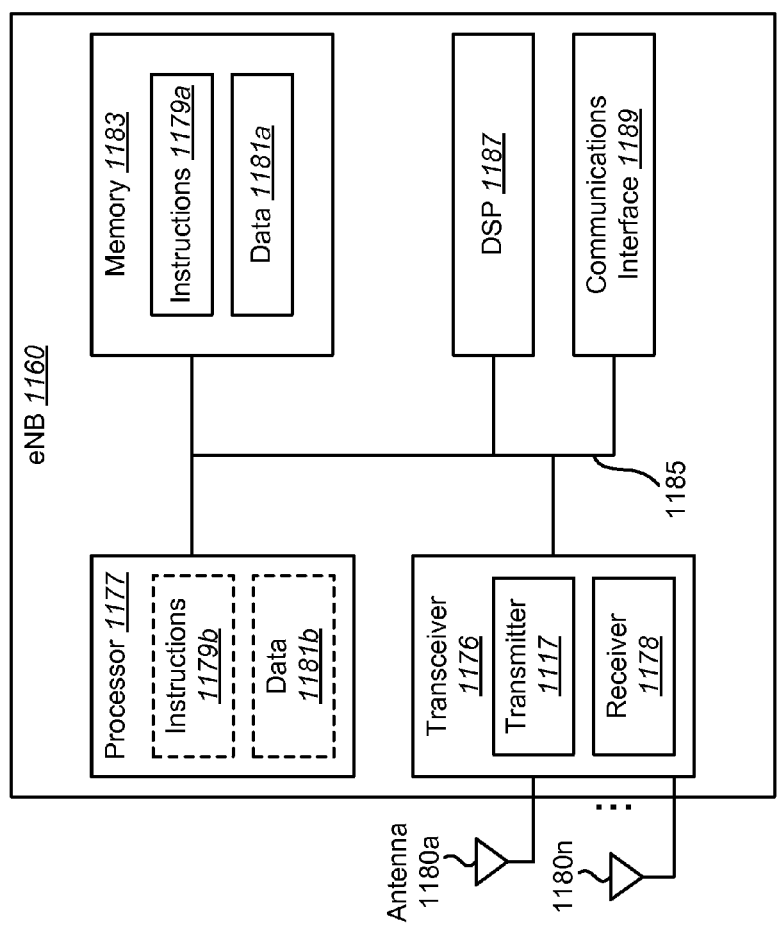
FIG. 11 illustrates various components that may be utilized in an eNB.

FIG. 11 illustrates various components that may be utilized in an eNB 1160. The eNB 1160 described in connection with FIG. 11 may be implemented in accordance with the eNB 160 described in connection with FIG. 1. The eNB 1160 includes a processor 1177 that controls operation of the eNB 1160. The processor 1177 may also be referred to as a central processing unit (CPU). Memory 1183, which may include read-only memory (ROM), random access memory (RAM), a combination of the two or any type of device that may store information, provides instructions 1179a and data 1181a to the processor 1177. A portion of the memory 1183 may also include non-volatile random access memory (NVRAM). Instructions 1179b and data 1181b may also reside in the processor 1177. Instructions 1179b and/or data 1181b loaded into the processor 1177 may also include instructions 1179a and/or data 1181a from memory 1183 that were loaded for execution or processing by the processor 1177. The instructions 1179b may be executed by the processor 1177 to implement one or more of the methods 300, 600, 700, 800 and 900 described above.

The eNB 1160 may also include a housing that contains one or more transmitters 1117 and one or more receivers 1178 to allow transmission and reception of data. The transmitter(s) 1117 and receiver(s) 1178 may be combined into one or more transceivers 1176. One or more antennas 1180a-n are attached to the housing and electrically coupled to the transceiver 1176.

The various components of the eNB 1160 are coupled together by a bus system 1185, which may include a power bus, a control signal bus and a status signal bus, in addition to a data bus. However, for the sake of clarity, the various buses are illustrated in FIG. 11 as the bus system 1185. The eNB 1160 may also include a digital signal processor (DSP) 1187 for use in processing signals. The eNB 1160 may also include a communications interface 1189 that provides user access to the functions of the eNB 1160. The eNB 1160 illustrated in FIG. 11 is a functional block diagram rather than a listing of specific components.

Figure 12:
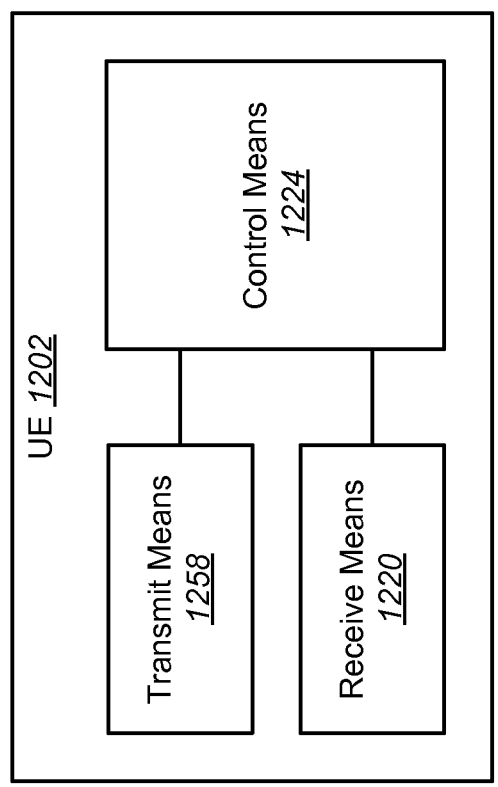
FIG. 12 is a block diagram illustrating one configuration of a UE in which systems and methods for feedback reporting may be implemented.

FIG. 12 is a block diagram illustrating one configuration of a UE 1202 in which systems and methods for feedback reporting may be implemented. The UE 1202 includes transmit means 1258, receive means 1220 and control means 1224. The transmit means 1258, receive means 1220 and control means 1224 may be configured to perform one or more of the functions described in connection with FIG. 2, FIG. 6, FIG. 7, FIG. 8, FIG. 9 and FIG. 10 above. FIG. 10 above illustrates one example of a concrete apparatus structure of FIG. 12. Other various structures may be implemented to realize one or more of the functions of FIG. 2, FIG. 6, FIG. 7, FIG. 8, FIG. 9 and FIG. 10. For example, a DSP may be realized by software.

Figure 13:
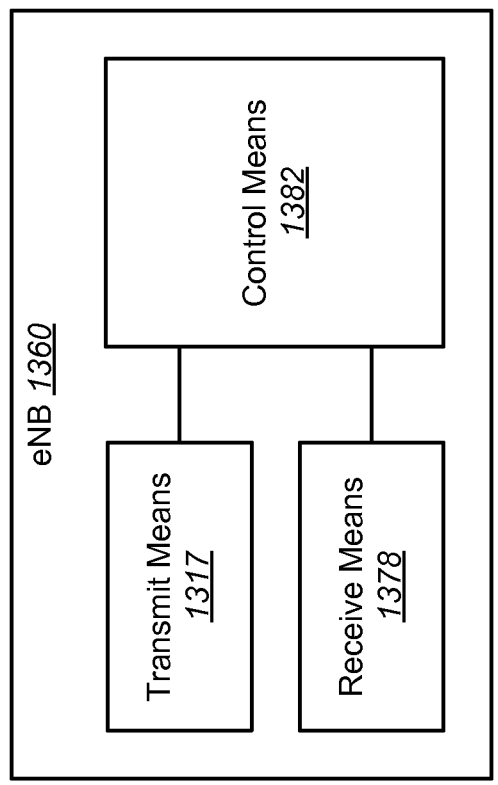
FIG. 13 is a block diagram illustrating one configuration of an eNB in which systems and methods for feedback reporting may be implemented.

FIG. 13 is a block diagram illustrating one configuration of an eNB 1360 in which systems and methods for feedback reporting may be implemented. The eNB 1360 includes transmit means 1317, receive means 1378 and control means 1382. The transmit means 1317, receive means 1378 and control means 1382 may be configured to perform one or more of the functions described in connection with FIG. 3, FIG. 6, FIG. 7, FIG. 8, FIG. 9 and FIG. 11 above. FIG. 11 above illustrates one example of a concrete apparatus structure of FIG. 13. Other various structures may be implemented to realize one or more of the functions of FIG. 3, FIG. 6, FIG. 7, FIG. 8, FIG. 9 and FIG. 11. For example, a DSP may be realized by software.

The term "computer-readable medium" refers to any available medium that can be accessed by a computer or a processor. The term "computer-readable medium," as used herein, may denote a computer- and/or processor-readable medium that is non-transitory and tangible. By way of example, and not limitation, a computer-readable or processor-readable medium may comprise RAM, ROM, Electrically Erasable Programmable Read-Only Memory (EEPROM), Compact Disc Read-Only Memory (CD-ROM) or other optical disk storage, magnetic disk storage or other magnetic storage devices, or any other medium that can be used to carry or store desired program code in the form of instructions or data structures and that can be accessed by a computer or processor. Disk and disc, as used herein, includes compact disc (CD), laser disc, optical disc, digital versatile disc (DVD), floppy disk and Blu-ray® disc where disks usually reproduce data magnetically, while discs reproduce data optically with lasers.

It should be noted that one or more of the methods described herein may be implemented in and/or performed using hardware. For example, one or more of the methods described herein may be implemented in and/or realized using a chipset, an application-specific integrated circuit (ASIC), a large-scale integrated circuit (LSI) or integrated circuit, etc.

Each of the methods disclosed herein comprises one or more steps or actions for achieving the described method. The method steps and/or actions may be interchanged with one another and/or combined into a single step without departing from the scope of the claims. In other words, unless a specific order of steps or actions is required for proper operation of the method that is being described, the order and/or use of specific steps and/or actions may be modified without departing from the scope of the claims.

It is to be understood that the claims are not limited to the precise configuration and components illustrated above. Various modifications, changes and variations may be made in the arrangement, operation and details of the systems, methods, and apparatus described herein without departing from the scope of the claims.

What is claimed is:

1. A user equipment (UE), comprising:
a processor; and
memory in electronic communication with the processor, wherein instructions stored in the memory are executable to:
 receive signaling to configure the UE with multiple serving cells wherein each of the multiple serving cells is configured with a first uplink/downlink (UL/DL) configuration;
 determine a downlink (DL)-reference UL/DL configuration for a serving cell; and
 send Physical Downlink Shared Channel (PDSCH) Hybrid Automatic Repeat Request Acknowledgement/Negative Acknowledgement (HARQ-ACK) information based on the DL-reference UL/DL configuration, wherein in a case that the serving cell is a secondary cell and is configured with additional information enabling dynamic UL/DL reconfiguration, then the DL-reference UL/DL configuration is determined based on a pair formed by a primary cell UL/DL configuration and a secondary cell UL/DL configuration, wherein the secondary cell UL/DL configuration is determined based on at least a UL/DL configuration included in the additional information for the serving cell.

2. The UE of claim 1, wherein the primary cell UL/DL configuration is the first UL/DL configuration of the primary cell in a case that the primary cell is not configured with additional information enabling dynamic UL/DL reconfiguration.

3. The UE of claim 1, wherein the primary cell UL/DL configuration is determined based on at least additional information for the primary cell in a case that the primary cell is configured with the additional information enabling dynamic UL/DL reconfiguration.

4. The UE of claim 1, wherein in a case that the serving cell is a primary cell and is configured with additional information enabling dynamic UL/DL reconfiguration, then the DL-reference UL/DL configuration is determined based on at least the additional information for the serving cell and the additional information includes a UL/DL configuration.

5. The UE of claim 1, wherein in a case that the serving cell is a primary cell and not configured with additional information enabling dynamic UL/DL reconfiguration, then the DL-reference UL/DL configuration is determined based on the first UL/DL configuration for the serving cell.

6. An evolved Node B (eNB), comprising:
a processor; and
memory in electronic communication with the processor, wherein instructions stored in the memory are executable to:
 send signaling to configure a user equipment (UE) with multiple serving cells wherein each of the multiple serving cells is configured with a first uplink/downlink (UL/DL) configuration;
 determine a downlink (DL)-reference UL/DL configuration for a serving cell;
 receive Physical Downlink Shared Channel (PDSCH) Hybrid Automatic Repeat Request Acknowledgement/Negative Acknowledgement (HARQ-ACK) information based on the DL-reference UL/DL configuration, wherein in a case that the serving cell is a secondary cell and is configured with additional information enabling dynamic UL/DL reconfiguration, then the DL-reference UL/DL configuration is determined based on a pair formed by a primary cell UL/DL configuration and a secondary cell UL/DL configuration, wherein the secondary cell UL/DL configuration is determined based on at least a UL/DL configuration included in the additional information for the serving cell.

7. The eNB of claim 6, wherein the primary cell UL/DL configuration is the first UL/DL configuration of the primary cell in a case that the primary cell is not configured with additional information enabling dynamic UL/DL reconfiguration.

8. The eNB of claim 6, wherein the primary cell UL/DL configuration is determined based on at least additional information for the primary cell in a case that the primary cell is configured with the additional information enabling dynamic UL/DL reconfiguration.

9. The eNB of claim 6, wherein in a case that the serving cell is a primary cell and is configured with additional information enabling dynamic UL/DL reconfiguration, then the DL-reference UL/DL configuration is determined based on at least the additional information for the serving cell and the additional information includes a UL/DL configuration.

10. The eNB of claim 6, wherein in a case that the serving cell is a primary cell and not configured with additional information enabling dynamic UL/DL reconfiguration, then the DL-reference UL/DL configuration is determined based on the first UL/DL configuration for the serving cell.

11. A method performed by a user equipment (UE), comprising:
receiving signaling to configure the UE with multiple serving cells wherein each of the multiple serving cells is configured with a first uplink/downlink (UL/DL) configuration;
determining a downlink (DL)-reference UL/DL configuration for a serving cell; and
sending Physical Downlink Shared Channel (PDSCH) Hybrid Automatic Repeat Request Acknowledgement/ Negative Acknowledgement (HARQ-ACK) information based on the DL-reference UL/DL configuration, wherein in a case that the serving cell is a secondary cell and is configured with additional information enabling dynamic UL/DL reconfiguration, then the DL-reference UL/DL configuration is determined based on a pair formed by a primary cell UL/DL configuration and a secondary cell UL/DL configuration, wherein the secondary cell UL/DL configuration is determined based on at least a UL/DL configuration included in the additional information for the serving cell.

12. The method of claim 11, wherein the primary cell UL/DL configuration is the first UL/DL configuration of the primary cell in a case that the primary cell is not configured with additional information enabling dynamic UL/DL reconfiguration.

13. The method of claim 11, wherein the primary cell UL/DL configuration is determined based on at least additional information for the primary cell in a case that the primary cell is configured with the additional information enabling dynamic UL/DL reconfiguration.

14. The method of claim 11, wherein in a case that the serving cell is a primary cell and is configured with additional information enabling dynamic UL/DL reconfiguration, then the DL-reference UL/DL configuration is determined based on at least the additional information for the serving cell and the additional information includes a UL/DL configuration.

15. The method of claim 11, wherein in a case that the serving cell is a primary cell and not configured with additional information enabling dynamic UL/DL reconfiguration, then the DL-reference UL/DL configuration is determined based on the first UL/DL configuration for the serving cell.

16. A method performed by an evolved Node B (eNB), comprising:
    sending signaling to configure a user equipment (UE) with multiple serving cells wherein each of the multiple serving cells is configured with a first uplink/downlink (UL/DL) configuration;
    determining a downlink (DL)-reference UL/DL configuration for a serving cell;
    receiving Physical Downlink Shared Channel (PDSCH) Hybrid Automatic Repeat Request Acknowledgement/Negative Acknowledgement (HARQ-ACK) information based on the DL-reference UL/DL configuration, wherein in a case that the serving cell is a secondary cell and is configured with additional information enabling dynamic UL/DL reconfiguration, then the DL-reference UL/DL configuration is determined based on a pair formed by a primary cell UL/DL configuration and a secondary cell UL/DL configuration, wherein the secondary cell UL/DL configuration is determined based on at least a UL/DL configuration included in the additional information for the serving cell.

17. The method of claim 16, wherein the primary cell UL/DL configuration is the first UL/DL configuration of the primary cell in a case that the primary cell is not configured with additional information enabling dynamic UL/DL reconfiguration.

18. The method of claim 16, wherein the primary cell UL/DL configuration is determined based on at least additional information for the primary cell in a case that the primary cell is configured with the additional information enabling dynamic UL/DL reconfiguration.

19. The method of claim 16, wherein in a case that the serving cell is a primary cell and is configured with additional information enabling dynamic UL/DL reconfiguration, then the DL-reference UL/DL configuration is determined based on at least the additional information for the serving cell and the additional information includes a UL/DL configuration.

20. The method of claim 16, wherein in a case that the serving cell is a primary cell and not configured with additional information enabling dynamic UL/DL reconfiguration, then the DL-reference UL/DL configuration is determined based on the first UL/DL configuration for the serving cell.

* * * * *